(12) United States Patent
Hayashi et al.

(10) Patent No.: US 8,407,904 B2
(45) Date of Patent: Apr. 2, 2013

(54) ROTARY LASER BEAM EMITTER

(75) Inventors: Kunihiro Hayashi, Itabashi-ku (JP);
Fumihiko Kamizono, Itabashi-ku (JP)

(73) Assignee: Kabushiki Kaisha Topcon, Tokyo (JP)

( * ) Notice: Subject to any disclaimer, the term of this patent is extended or adjusted under 35 U.S.C. 154(b) by 262 days.

(21) Appl. No.: 12/797,762

(22) Filed: Jun. 10, 2010

(65) Prior Publication Data

US 2010/0313433 A1 Dec. 16, 2010

(30) Foreign Application Priority Data

Jun. 12, 2009 (JP) ................................. 2009-140630

(51) Int. Cl.
*G01C 15/00* (2006.01)

(52) U.S. Cl. ..................................... 33/291; 33/DIG. 21

(58) Field of Classification Search .................... 33/290, 33/286, 227, 228, DIG. 21

See application file for complete search history.

(56) References Cited

U.S. PATENT DOCUMENTS

| | | | | |
|---|---|---|---|---|
| 5,331,395 | A * | 7/1994 | Piske et al. | 33/DIG. 21 |
| 5,680,208 | A * | 10/1997 | Butler et al. | 33/283 |
| 5,907,907 | A * | 6/1999 | Ohtomo et al. | 33/291 |
| 6,314,651 | B1 * | 11/2001 | Ohtomo et al. | 33/290 |
| 6,848,188 | B2 * | 2/2005 | Tacklind et al. | 33/290 |
| 6,906,310 | B1 * | 6/2005 | Jiang et al. | 33/290 |
| 6,931,739 | B2 * | 8/2005 | Chang et al. | 33/286 |
| 7,059,058 | B2 * | 6/2006 | Kousek et al. | 33/290 |
| 7,319,515 | B2 | 1/2008 | Ohtomo et al. | |
| 7,543,391 | B2 * | 6/2009 | Bogel | 33/286 |
| 7,793,424 | B2 * | 9/2010 | Laabs et al. | 33/290 |
| 7,965,383 | B2 * | 6/2011 | Hayashi et al. | 356/4.01 |
| 8,171,649 | B2 * | 5/2012 | Kallabis et al. | 33/290 |
| 2004/0107589 | A1 * | 6/2004 | Ohtomo et al. | 33/290 |
| 2004/0135990 | A1 * | 7/2004 | Ohtomo et al. | 356/4.01 |
| 2008/0209745 | A1 * | 9/2008 | Tamamura | 33/286 |
| 2009/0241359 | A1 * | 10/2009 | Hayashi et al. | 33/284 |
| 2010/0031520 | A1 * | 2/2010 | Stefan et al. | 33/290 |
| 2010/0031521 | A1 * | 2/2010 | Stefan et al. | 33/290 |

(Continued)

FOREIGN PATENT DOCUMENTS

| | | |
|---|---|---|
| CN | 1743807 | 3/2006 |
| GB | 878463 | 5/1958 |
| JP | 2006-71545 | 3/2007 |
| JP | 2007-71545 | 3/2007 |

OTHER PUBLICATIONS

Chinese Office Action issued Feb. 16, 2012 in corresponding Chinese Application No. 201010212835.5.

*Primary Examiner* — Yaritza Guadalupe-McCall
(74) *Attorney, Agent, or Firm* — Wenderoth, Lind & Ponack, L.L.P.

(57) ABSTRACT

A rotary laser beam emitter includes a base unit including a reference reflector with a reference reflective face parallel to a reference plane, a rotary element rotatably supported on the base unit around a rotary axis, and a beam emitting unit contained in the rotary element and including a light source and an optical emission system emitting the laser beam from the light source in a direction parallel to the reference plane on the optical axis. When the rotary element is inclined relative to the rotary axis and the emitted laser beam is inclined to the reference plane, the optical emission system emits the laser beam from the light source to the reference reflective face and emit the laser beam reflected by the reference reflective face in a direction inclined to the optical axis of the laser beam so as to neutralize the inclined laser beam.

10 Claims, 23 Drawing Sheets

U.S. PATENT DOCUMENTS

2010/0088910 A1* 4/2010 Svanholm et al. .............. 33/290
2010/0313433 A1* 12/2010 Hayashi et al. ................. 33/291
2010/0321673 A1* 12/2010 Hayashi et al. ............ 356/139.1
2011/0099822 A1* 5/2011 Koleszar et al. ................ 33/228

* cited by examiner

FIG.3

ROTARY LASER BEAM EMITTER

CROSS REFERENCE TO RELATED APPLICATION

The present application is based on and claims priority from Japanese Patent Application No. 2009-140630, filed on Jun. 12, 2009, the disclosure of which is hereby incorporated by reference in its entirety.

BACKGROUND OF THE INVENTION

1. Field of the Invention

The present invention relates to a rotary laser beam emitter which rotates to irradiate a laser beam in a level plane.

2. Description of the Related Art

In surveying work for civil engineering, it is well known that a height and an inclination angle of a target relative to a level plane is measured using a rotary laser beam emitter which is placed on a known point and rotates to irradiate a laser beam in a level plane. The laser beam from the rotary laser beam emitter is received by a light receiver to measure an incidence angle and a height relative to a level plane orthogonal to a rotary axis of the rotary laser beam emitter at the light receiving position. Such a rotary laser beam emitter comprises a beam emitting unit rotatable on a base unit to emit a laser beam in a direction orthogonal to the rotary axis. To improve an accuracy of measuring the inclination angle and height, the rotary laser beam emitter is required to reduce a variation in an exit angle of the laser beam relative to the rotary axis as much as possible.

Japanese Laid-open Patent Publication No. 2006-71545 discloses a rotary laser beam emitter which comprises a rotary element rotatable around a rotary axis on a base unit and accommodating a plurality of pentaprisms longitudinally arranged on the rotary axis, and a light source on a base unit which emits a laser bean towards the pentaprisms in a rotary axis direction, for example. In this rotary laser beam emitter, by rotation of the rotary element relative to the base unit, each pentaprism is rotated to reflect and change the exit direction of the laser beam from the light source. The pentaprisms (rotary element) can be stably rotated since they are longitudinally arranged inside the rotary element on the rotary axis, which can substantially reduce a variation in the exit direction of the laser beam due to rotary vibrations or else.

However, a problem arises in this rotary laser beam emitter when another measuring device (GPS receiver, for example) is mounted above the pentaprisms (on the rotary element) that the measuring device is rotated together with the rotary element. In order to prevent this, it is possible to provide an outer case for the rotary element to be able to rotate inside the case and a plane to mount the measuring device above the case. However, the case needs to include a vertical connecting portion to the base unit outside the rotary element, and there still remains a problem that the connecting portion interrupts the emitted laser beam in a part of the rotary direction of the rotary element.

Instead of the outer case, a shaft element can be provided on the base unit to be coaxial with the rotary axis and extend from the base unit along the rotary axis. It can be configured to insert the shaft element into a through hole of the rotary element. Thereby, another measuring device can be mounted over the shaft element.

However, with such a configuration, a light source has to be placed around the rotary axis (that is, shaft element) so that the center of gravity of the rotary element balances off from the rotary axis. This may result in changing a posture of the rotary element relative to the rotary axis and varying the direction of the emitted laser beam, which decreases a measuring accuracy of the inclination angle and height of a target.

SUMMARY OF THE INVENTION

The present invention aims to provide a rotary laser beam emitter which comprises a ring-like rotary element around the rotary axis including a light emitting unit to rotate to irradiate a laser beam in a level plane and which can prevent a variation in the exit direction of the laser beam.

According to one aspect of the present invention, a rotary laser beam emitter comprises a base unit; a rotary element supported on the base unit and rotatable around a rotary axis; a beam emitting unit contained in the rotary element and emitting a laser beam along a reference plane orthogonal to the rotary axis, wherein the base unit includes a reference reflector which comprises a reference reflective face parallel to the reference plane; the beam emitting unit comprises a light source which emits a laser beam and an optical emission system which receives the laser beam from the light source to emit in a direction parallel to the reference plane; and when the rotary element is inclined relative to the rotary axis and the laser beam from the light source is inclined to the reference plane, the optical emission system is configured to emit the inclined laser beam to the reference reflective face and emit the laser beam reflected by the reference reflective face in a direction inclined to an optical axis of the inclined laser beam so as to neutralize the inclination of the laser beam.

BRIEF DESCRIPTION OF THE DRAWINGS

These and other objects, features and advantages of the present invention will become apparent from a detailed description with reference to the following drawings:

FIG. 3 shows the beam emitting unit in FIG. 2 in a rotary axis direction seen from the above;

DETAILED DESCRIPTION OF THE PREFERRED EMBODIMENTS

Figure 1:
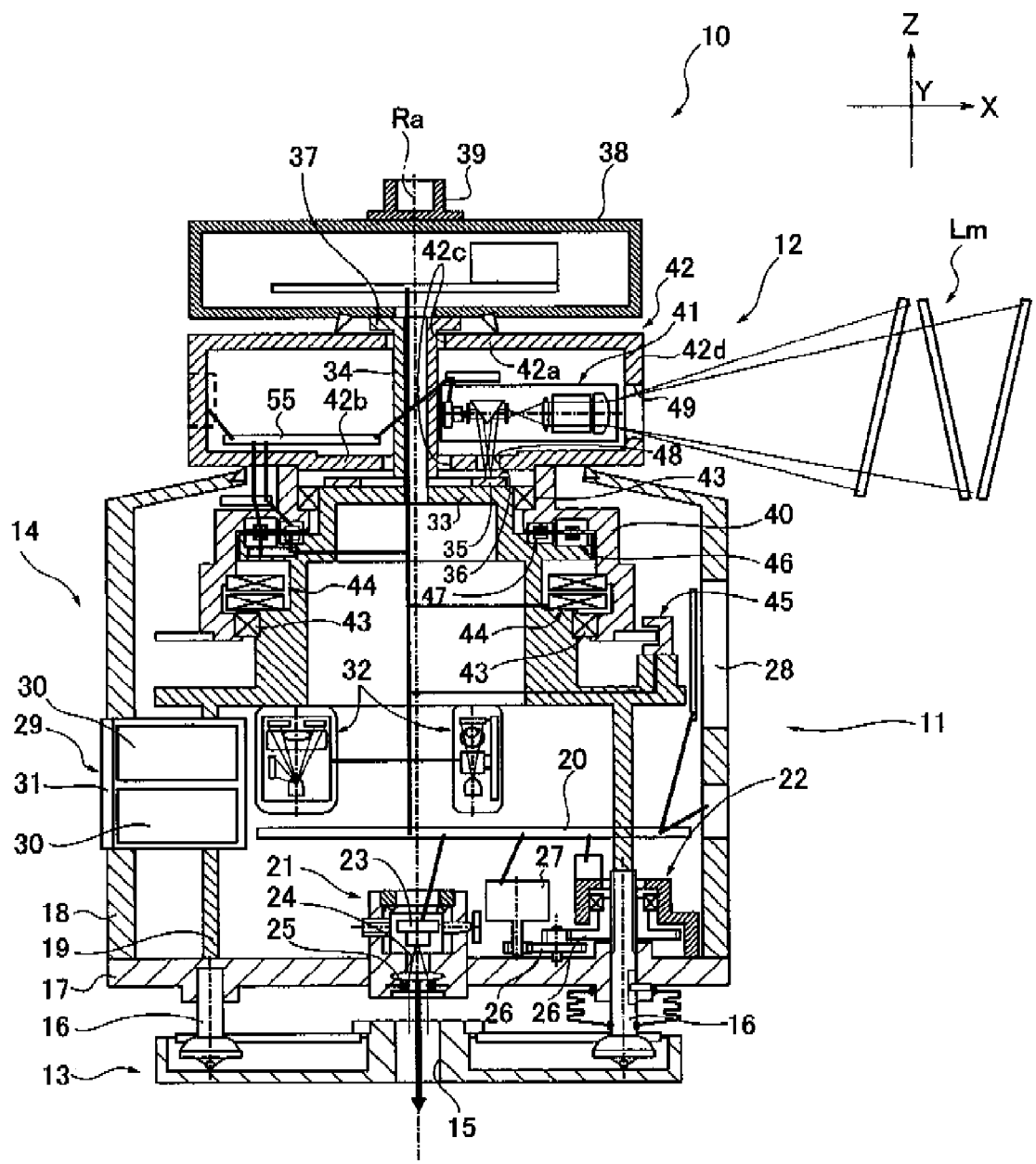
FIG. 1 schematically shows the structure of a rotary laser beam emitter according to a first embodiment of the present invention.
Figure 2:
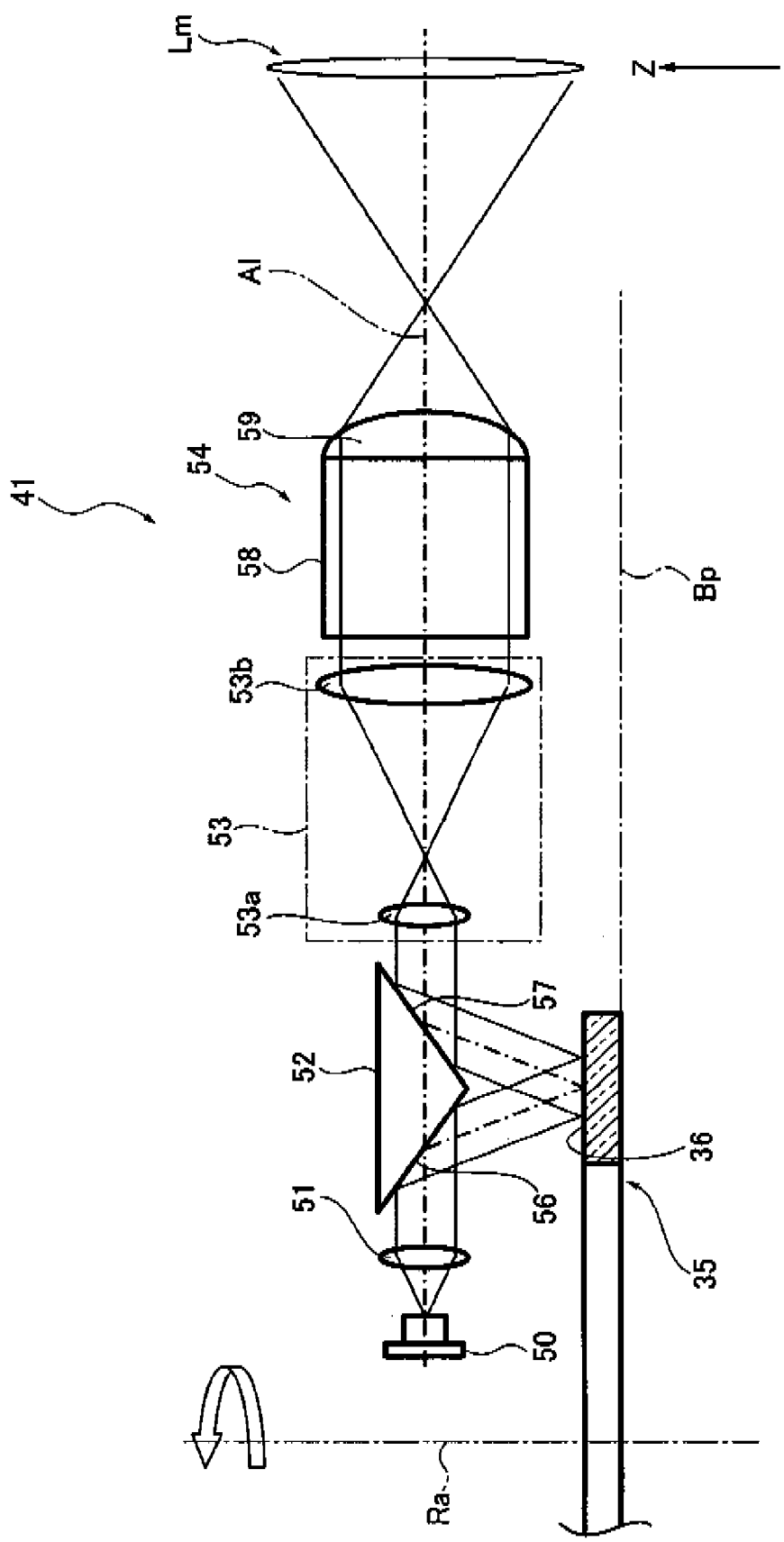
FIG. 2 schematically shows the structure of a beam emitting unit accommodated in a container of a rotary element.
Figure 3:
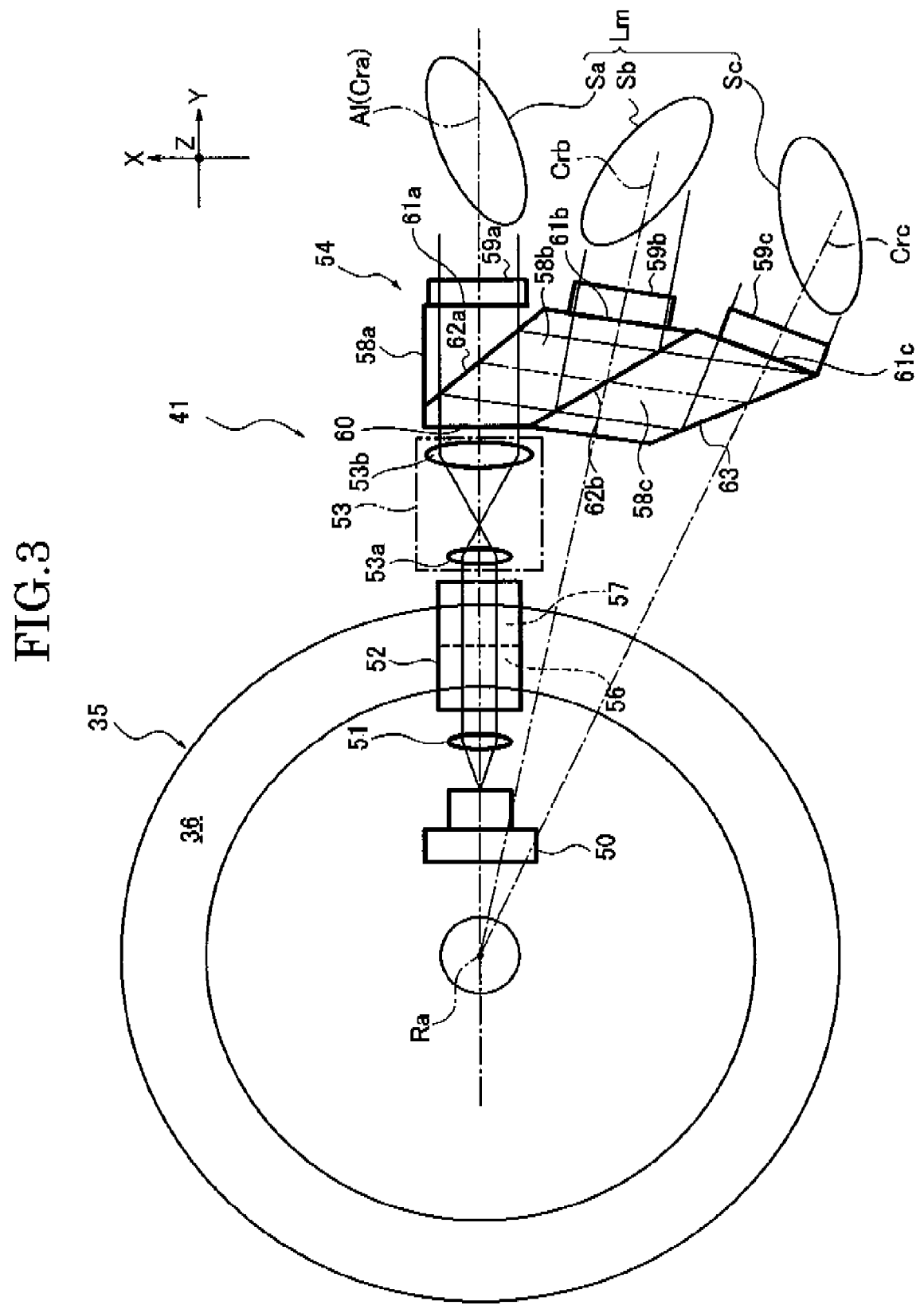
Figure 4:
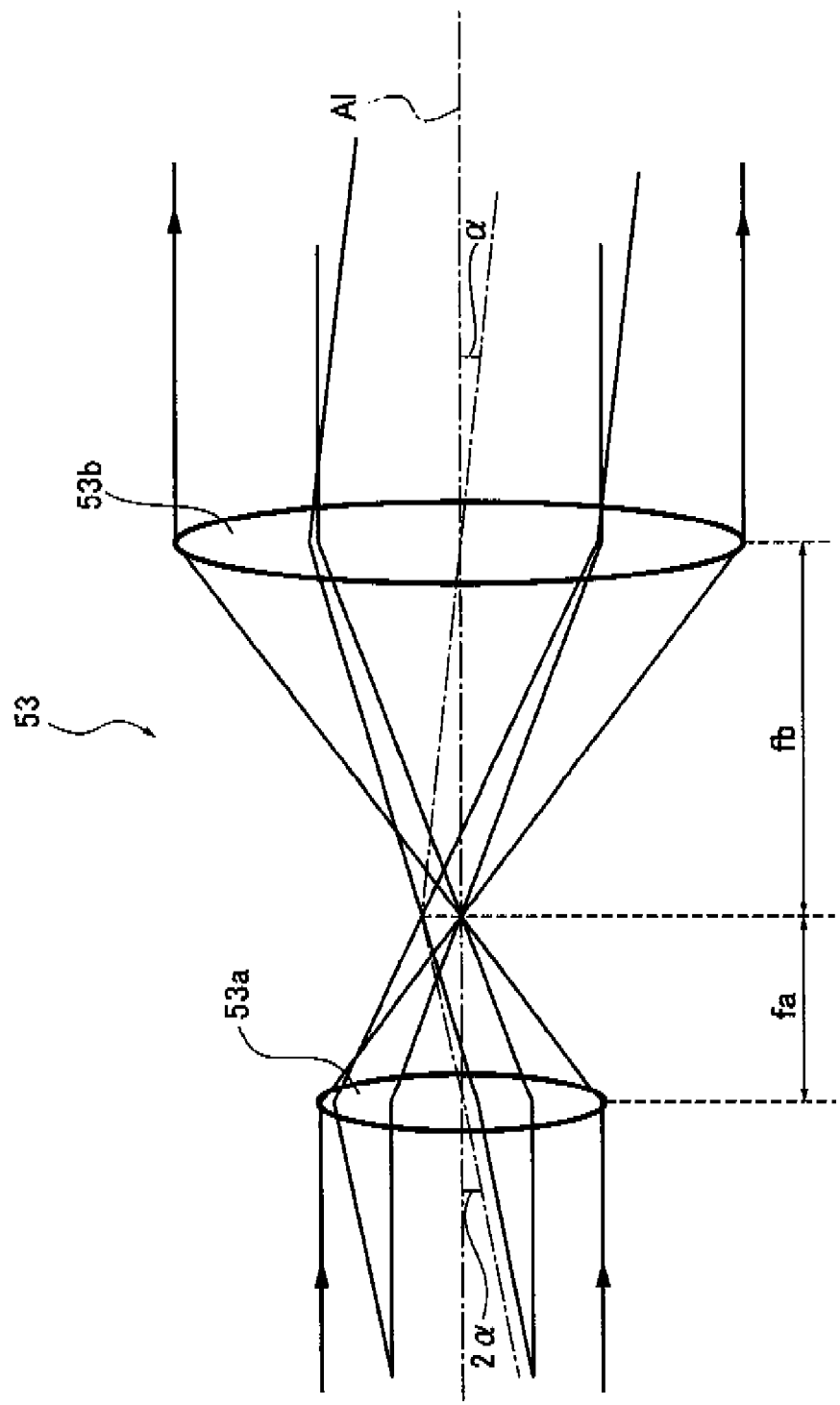
FIG. 4 shows a beam expander of the beam emitting unit.

Hereinafter, a rotary laser beam emitter according to embodiments of the present invention will be described in detail with reference to the accompanying drawings.
First Embodiment FIG. 1 shows a rotary laser beam emitter 10 according to a first embodiment of the present invention by way of example. FIG. 2 schematically shows the structure of a beam emitting unit 41 accommodated in a container 42 of a rotary element 12. FIG. 3 is a plain view of the beam emitting unit 41 in FIG. 2 in the rotary axis direction Ra seen from the above. FIG. 4 shows a beam expander 53 of the beam emitting unit 41. Note that hereinafter, it is assumed that the rotary axis Ra is to be a Z axis and a plane orthogonal to the Z axis is an X-Y plane.

In the rotary laser beam emitter 10 in FIG. 1, the rotary element 12 is rotatably supported on a base unit 11. The rotary laser beam emitter 10 is placed at a known point for surveying and rotates to irradiate a laser beam Lm at a certain velocity in a level plane.

The base unit 11 is used as a reference for setting the rotary laser beam emitter 10 at a known point and composed of a stage 13 and a case 14 disposed over the stage 13. The stage 13 includes a not-shown leg portion to support the rotary laser beam emitter 10 and an opening 15 for positioning it in the center. Three screws 16 (only two of them shown in FIG. 1) are provided around the opening 15 with a same interval to support the case 14. One of them is fixed to the case 14 while screw amount of two of them is changeable to be able to adjust an inclination and a height of the case 14.

The case 14 comprises a bottom wall 17 in a disc shape into which the screws 16 are screwed, an outer wall 18 in a cylindrical shape forming an outer shape with the bottom wall 17, and an inner cylinder 19 provided on the bottom wall 17 inside the outer wall 18.

The case 14 accommodates a main board 20 as a controller which is electrically connected to the other elements to collectively control the operations thereof.

A beam emitting system 21 and a level adjusting system 22 are provided on the bottom wall 17 of the case 14 which operate in accordance with a manipulation to a not-shown operation unit under control of the controller 20.

The beam emitting system 21 is placed in the center of the bottom wall 17 and includes a light source 23 to emit a laser beam which passes through the opening 15 of the stage 13 via a through hole 24 and a collimator lens 25 of the bottom wall 17 to form beam spots (not shown) as a reference for a setting position on a mount of the rotary laser beam emitter 10. The optical axis of the beam emitting system 21 coincides with the center axis of the case 14 or the base unit 11 and a later-described rotary axis Ra. Use of the beam spots of the beam emitting system 21 makes it easier to position the rotary laser beam emitter 10.

The level adjusting system 22 is configured to adjust an inclination of the bottom wall 17 or the case 14 relative to the stage 13 by the two screws 16 whose screw amount is changeable. The level adjusting system 22 includes a gear 26 and a level adjusting motor 27 screwed with the screws 16 via the gear 26. By driving the level adjusting motor 27 to rotate the screws 16, the screw amount thereof to the bottom wall 17 can be adjusted to adjust the inclination of the bottom wall 17 or the case 14 relative to the stage 13.

Moreover, a panel display 28 and a battery container 29 are provided in the outer wall 18. The panel display 28 displays a variety of information on the rotary laser beam emitter 10 and is controlled by the controller 20. The battery container 29 contains a battery 30 to supply electric power to the rotary laser beam emitter 10 and is covered with a plate 31 for opening/closing.

The inner cylinder 19 of the case 14 includes a pair of tilt sensors 32 which detect an inclination of the inner cylinder 19 relative to a level plane. One of them detects an inclination thereof around an X axis and the other detects the same around a Y axis.

The inner cylinder 19 includes, in an upper portion, a top wall 33 defining a reference plane Bp (FIG. 2 and else) orthogonal to the center axis (rotary axis Ra) of the inner cylinder 19 and a tubular support shaft 34 (support shaft) extending along the center axis. When the pair of tilt sensors 32 detects no inclination of the inner cylinder 19, the reference plane Bp is parallel to the level plane.

A ring-like mirror 35 (FIG. 3) is provided on the reference plane Bp to surround the support shaft 34 with a certain interval and includes a ring-like reflective face 36 as a reference reflective face. The reflective face 36 of the ring-like mirror 35 is formed on the reference plane Bp to coincide with a ring-like orbit of an on-axis reflector 52 of the beam emitting unit 41 on the X-Y plane when the rotary element 12 rotates around the rotary axis Ra (later described). The ring-like mirror 35 functions as a reference reflector including a reference reflective face. The ring-like reflective face 36 is always positioned below the on-axis reflector 52 of the beam emitting unit 41 (−Z axis direction in FIG. 2) irrespective of the rotary position of the rotary element 12 around the rotary axis Ra.

The support shaft 34 includes a mount 37 in a top end on which a radio unit 38 is disposed in the first embodiment. An adaptor 39 for installing a not-shown GPS reception terminal is provided on the radio unit 38.

The inner cylinder 19 rotatably supports the rotary element 12 which comprises a base 40 supported by the inner cylinder 19 and a container 42 accommodating the beam emitting unit 41.

The base 40 is in a tubular shape to fit with the upper shape of the inner cylinder 19, and supported by the inner cylinder 19 via a bearing element 43 to be rotatable around the fulcrum shaft of the inner cylinder 19. Accordingly, the fulcrum shaft of the inner cylinder 19 is the rotary axis Ra of the base 40 or the rotary element 12.

A direct drive motor (hereinafter, DD motor) 44, an encoder 45, an electric transmitter 46, and a data transfer system 47 are provided between the base 40 and the inner cylinder 19. The base 40 is rotated relative to the inner cylinder 19 by driving the DD motor 44. The encoder 45 detects the rotary velocity and rotary amount of the base 40. The electric transmitter 46 is configured to supply power between the base 40 and the inner cylinder 19 even in the rotation of the base 40 so that the data transfer system 47 can transfer data therebetween. The container 42 is fixed on the base 40.

The container 42 is a hollow column and includes a top wall 42a and a bottom wall 42b with a through hole 42c coaxial with the fulcrum shaft in their center portions. While the base 40 is rotatably supported by the inner cylinder 19, the support shaft 34 of the inner cylinder 19 is inserted into the through hole 42c and the top end (mount 37) of the support shaft 34 protrudes from the top wall 42a. Because of this, the mount 37 is not rotated along with the rotation of the container 42 and the base 40 relative to the inner cylinder 19. Therefore, another measuring device (radio unit 38 in the present embodiment) is stably supported over the container 42 including the beam emitting unit 41. The bottom wall 42b of the container 42 includes a through hole 48 below the on-axis reflector 52. The through hole 38 forms optical paths (P2 and P3 in FIG. 6) of a laser beam on the optical axis Al of the beam emitting unit 41 which is reflected by the on-axis reflector 52, the reflective face 36 of the ring-like mirror 35 and by the on-axis reflector 52 again to return to the optical axis Al.

The beam emitting unit 41 is configured to irradiate a laser beam from an opening 49 of a side wall 42d of the container 42. Accordingly, with the rotation of the rotary element 12 relative to the inner cylinder 19, the rotary laser beam emitter 10 can irradiate a laser beam Lm in every direction around the rotary axis Ra.

As shown in FIG. 2 and FIG. 3, the beam emitting unit 41 comprises a semiconductor laser diode (hereinafter, LD) 50, a collimator lens 51, the on-axis reflector 52, the beam expander 53, and a beam shaping system 54. The optical axis Al thereof is set to be in parallel with the reference plane Bp defined by the top wall 33 of the inner cylinder 19 while the rotary axis Ra coincides with the fulcrum shaft of the rotary element 12.

The LD 50 is electrically connected with a drive control board 55 (FIG. 1) as a drive controller of the beam emitting unit 41. The LD 50 (light source) emits a laser beam on the optical axis Al under the control of the drive controller. The collimator lens 51, on-axis reflector 52, beam expander 53 and beam shaping system 54 are arranged on the optical axis Al.

The collimator lens 51 collimates the laser beam from the LD 50 to be a parallel beam and the parallel beam travels to the on-axis reflector 52.

The on-axis reflector 52 includes a first reflective face 56 facing the LD 50 and a second reflective face 57 facing the beam expander 53. The first reflective face 56 reflects the parallel beam from the collimator lens 51 to the reflective face 36 of the ring-like mirror 35 on the reference plane Bp of the inner cylinder 19 via the through hole 48 (FIG. 1) of the container 42. The second reflective face 57 reflects the laser beam reflected by the first reflective face 56 and the ring-like reflective face 36 and having passed through the through hole 48 to the beam expander 53 on the optical axis Al. In the first embodiment, since the optical axis Al and the reference plane Bp are parallel to each other and the reflective face 36 of the ring-like mirror 35 is parallel to the reference plane Bp, the absolute value of an inclination angle of the first reflective face 56 is set to be equal to that of the second reflective face 57 relative to the optical axis Al.

According to the first embodiment the on-axis reflector 52 is a triangular prism whose cross section in the vertical direction is an isosceles triangle. It is disposed so that the apex angle of the isosceles triangle faces the reference plane Bp while the base of the triangle is parallel to the reference plane Bp and extends in the optical axis direction. That is, the first and second reflective faces 56, 57 are two equal sides of the isosceles triangle in their cross sections.

The laser beam reflected by the second reflective face 57 travels to the beam expander 53 on the optical axis Al. The beam expander 53 is constituted of lenses 53a, 53b and expands a beam size of an incident parallel beam and emits it as shown in FIG. 4. In the present embodiment a ratio of the focal length (lens 53b side) of the lens 53a and that of the lens 53b (lens 53a side) is set to 1 to 2 and the angular magnification is set to 1/2. Because of this, a laser beam is incident on the lens 53a of the beam expander 53 at angle $2\alpha$ (counterclockwise in FIG. 4) and emitted from the lens 53b at angle $-\alpha$ relative to the optical axis (optical axis Al). This relation of the incidence angle and the exit angle is established only when the incidence angle is small but it applies to all of the laser beams incident on the beam expander 53.

The beam shaping system 54 splits the laser beam from the beam expander 53 into three and shapes each of the three laser beams into a fan beam. As shown in FIG. 3, the beam shaping system 54 includes three prism blocks 58a, 58b, 58c for beam split and three cylindrical lenses 59a, 59b, 59c for beam shaping. The prism blocks 58a, 58b, 58c are coupled with each other in parallel to the reference plane Bp and joined with the cylindrical lenses 59a, 59b, 59c, respectively.

Specifically, the prism block 58b includes an incidence end face 60 on the optical axis Al and the prism block 58 on the optical axis includes a first exit end face 61a. The joined faces of the prism block 58a and the prism block 58b constitute a beam splitter 62a. Also, the joined faces of the prism block 58b and the prism block 58c constitute a beam splitter 62b in a direction of the reflected laser beam from the beam splitter 62a on the optical axis Al. The prism block 58b includes a second exit end face 61b in a direction of the reflected laser beam from the beam splitter 62b. The prism block 58c includes a prism reflective face 63 in a direction of the laser beam reflected by the beam splitter 62a and passing through the beam splitter 62b. The prism block 58c includes a third exit end face 61c in a direction of the reflected laser beam from the prism reflective face 63.

The exit end faces 61a, 61b, 61c include the cylindrical lenses 59a, 59b, 59c, respectively which shape each parallel beam from the exit end faces 61a, 61b, 61c into a fan beam, a laser beam in a fan shape spreading towards a traveling direction.

In the beam shaping system 54 a laser beam on the optical axis Al is incident on the incidence end face 60 and the prism block 58 and split into two by the beam splitter 62a. One of the two beams passes through the beam splitter 62a and travels through the prism block 58a to the cylindrical lens 59a via the exit end face 61a while the other beam is reflected by the beam splitter 62a and travels through the prism block 58b and is split into two by the beam splitter 62b. One of the two beams split by the beam splitter 62b travels through the prism block 58b and the exit end face 61 to the cylindrical lens 59b. The other beam travels through the prism block 58c and is reflected by the prism reflective face 63 to the cylindrical lens 59c via the exit end face 61e.

In the beam shaping system 54, a fan beam from the cylindrical lens 59a is a laser beam Sa along the rotary axis Ra, a fan beam from the cylindrical lens 59c is a laser beam Sc substantially on the rotary axis Ra and makes a predetermined angle with the laser beam Sa in a level plane. A fan beam from the cylindrical lens 59b is a diagonal laser beam Sb connecting the top end of the laser beam Sa and the bottom end of the laser beam Sc (FIG. 5). The laser beams Sa, Sb, Sc form the laser beam Lin which the rotary laser beam emitter 10 irradiates in rotation. In the first embodiment, a traveling direction of the laser beam Sa is a principal ray Cra, that of the laser beam Sb is a principal ray Crb, that of the laser beam Sc is a principal ray Crc and the beam shaping system 54 is set so that the principal rays Cra, Crb, Crc intersect with each other at the same point on the rotary axis Ra.

Thus, the beam emitting unit 41 can irradiate the laser beam Lm from the opening 49 of the side wall 42d of the container 42 of the rotary element 12. The rotary laser beam emitter 10 irradiates the laser beam Lm along the reference plane Bp from the beam emitting unit 41 in every direction around the rotary axis Ra by rotation of the rotary element 12 relative to the inner cylinder 19.

Figure 5A:
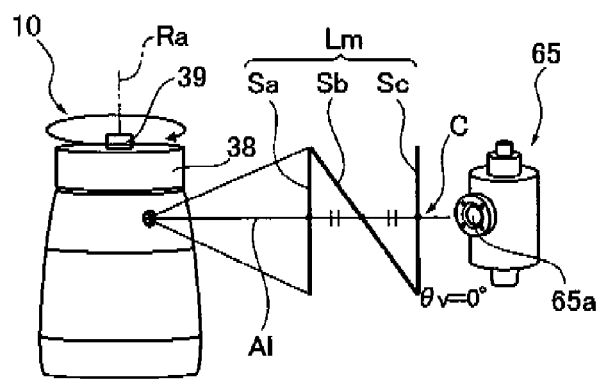
FIG. 5A shows one example of the rotary laser beam emitter in use for surveying when the rotary laser beam emitter and a laser receiver are placed in the same height.
Figure 5B:
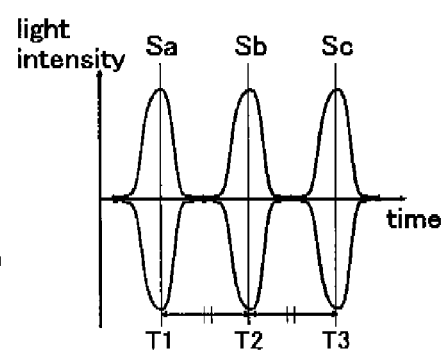
FIG. 5B shows light received by the laser receiver in FIG. 5A.
Figure 5C:
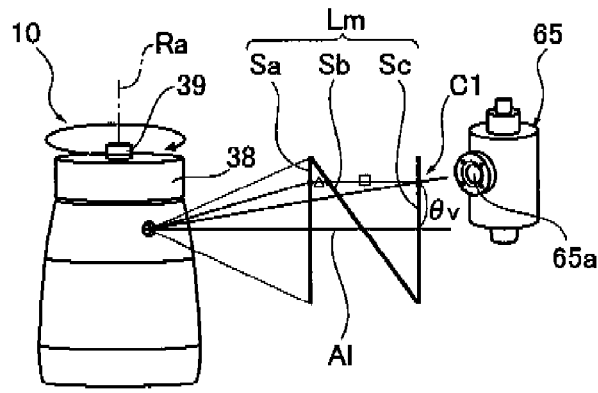
FIG. 5C shows another example of the rotary laser beam emitter when the rotary laser beam emitter is placed in a higher position than the laser receiver.
Figure 5D:
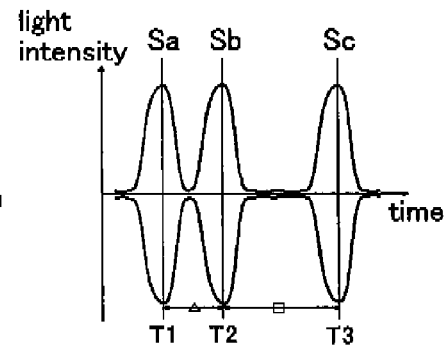
FIG. 5D shows light received by the laser receiver in FIG. 5C.

Next, surveying by use of the rotary laser beam emitter 10 will be described with reference to FIG. 5A to FIG. 5D. FIG. 5A shows the rotary laser beam emitter 10 and the laser receiver 65 placed at the same height. FIG. 5B shows a laser beam received by the laser beam receiver 65 of FIG. 5A. FIG. 5C shows the laser beam receiver 65 placed higher than the rotary laser beam emitter 10. FIG. 5D shows a laser beam received by the laser beam receiver 65 of FIG. 5C.

For surveying, the rotary laser beam emitter 10 is placed at a known point while the laser beam receiver 65 is placed in a target position to be surveyed. The laser beam receiver 65 outputs a detected light receiving signal and is comprised of a non-spherical lens having a directivity of ±10 degrees and a Si photodiode, for example. The target position can be accurately surveyed using the rotary laser beam emitter 10 as a reference by accurately measuring time interval of light receiving signals from the laser beam receiver 65.

For example, the laser beam receiver 65 receives the laser beams Sa, Sb, Sc at the center C of the laser beam Lm when the center of a light receiving portion 65a of the laser beam receiver 65 completely matches with the exit position (optical axis Al) of the rotary laser beam emitter 10 as in FIG. 5A. And, it outputs output signals in accordance with the laser beams Sa, Sb, Sc with a constant interval as shown in FIG. 5B.

Meanwhile, when the center of the light receiving portion 65a of the laser beam receiver 65 is above the exit position (optical axis Al) of the rotary laser beam emitter 10 by an output angle θv of the laser beam Lm, the laser beam receiver 65 receives the laser beams Sa, Sb, Sc at a position C1 above the center C of the laser beam Lm by the angle θV as in FIG. 5C. It outputs output signals in accordance with the laser beams Sa, Sb, Sc with a different time interval which depends on the interval of the laser beams Sa, Sb, Sc at the position C1.

Thus, the vertical angle of the laser beam receiver 65 at the target position relative to the known point can be accurately calculated by accurately measuring the time interval of light receiving signals from the laser beam receiver 65. Accordingly, it is able to accurately survey the target position by finding a distance and a direction between the known point and the target position.

Here, a problem may arise that during rotation of the rotary element 12 relative to the inner cylinder 19, the center of the rotation becomes eccentric or the rotary posture of the rotary element 12 to the rotary axis Ra is changed. Since the beam emitting unit 41 is disposed disproportionately relative to the rotary axis Ra in the rotary element 12, the center of gravity is moved along with the rotation of the rotary element 12. Even with an increase in support stiffness of the inner cylinder 19 for the rotary element 12, it is extremely hard to completely prevent a change of the rotary posture of the rotary element 12 relative to the rotary axis Ra (inner cylinder 19). Such a change in the rotary posture causes the exit direction of the laser beam to be inclined, which makes it impossible to conduct an accurate surveying.

Now, the features of the rotary laser beam emitter 10 according to the first embodiment will be described with reference to FIG. 6 to FIG. 9. It can always emit the laser beam Lm in parallel to the reference plane Bp even with the change in the rotary posture of the rotary element 12.

Figure 6:
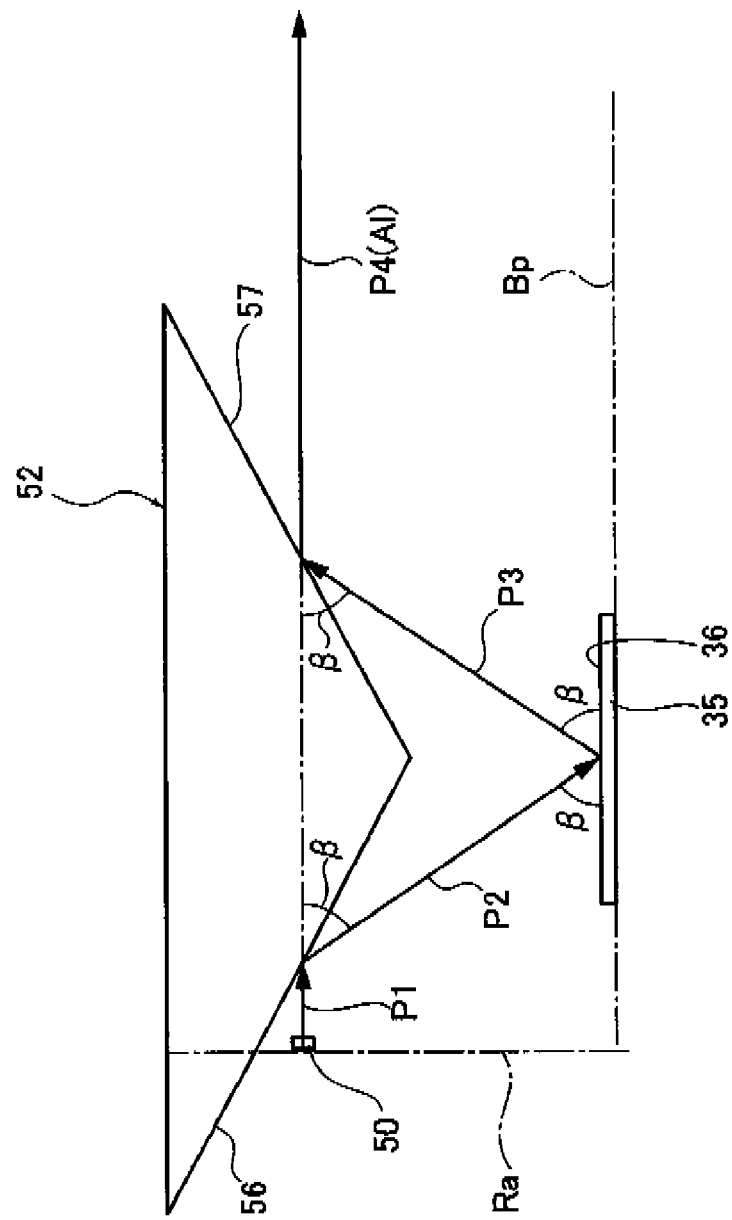
FIG. 6 shows the reference position of the beam emitting unit of the rotary laser beam emitter.
Figures 7A, 7B:
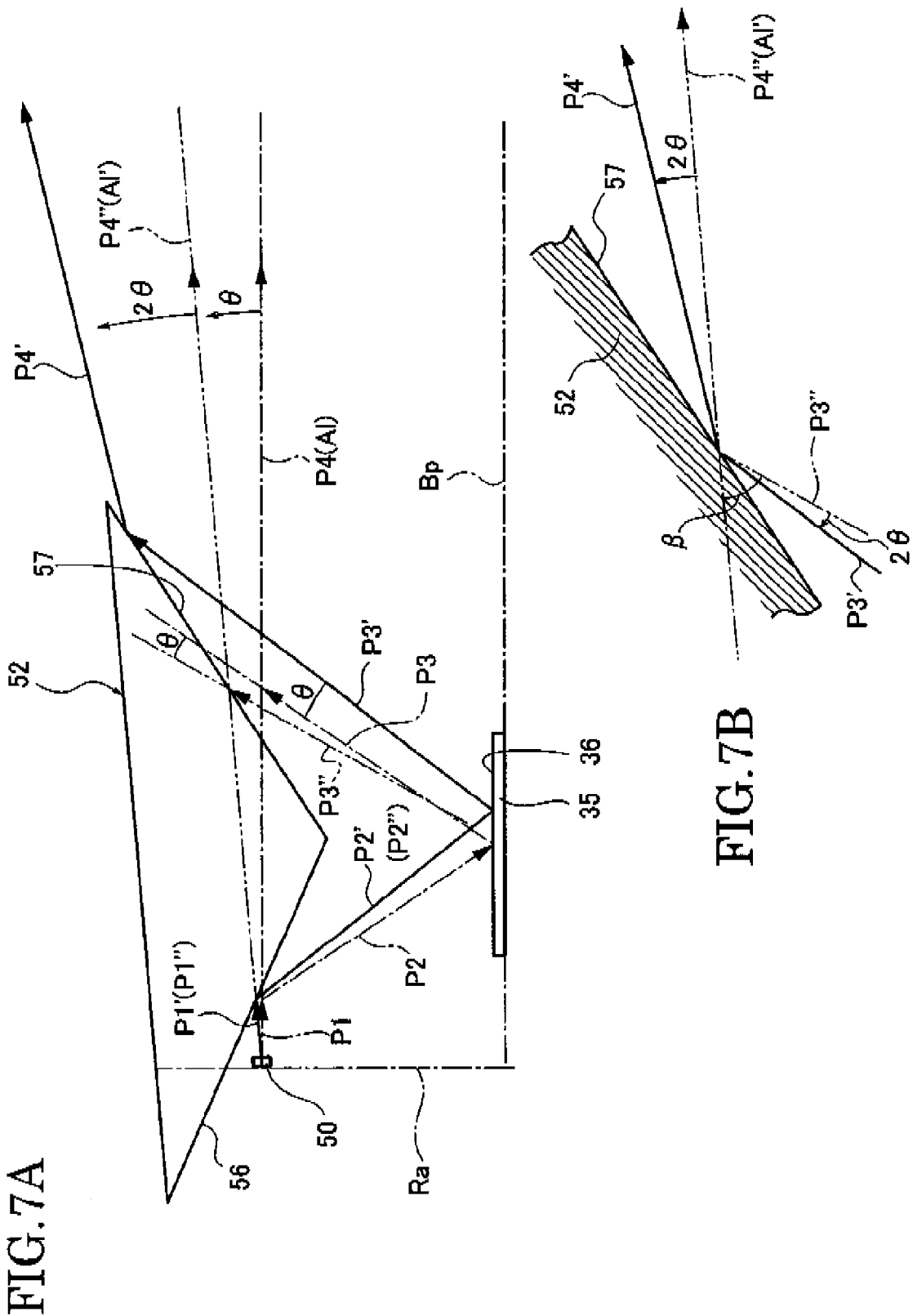
FIG. 7A shows the beam emitting unit of the rotary laser beam emitter when the optical axis is inclined by an angle θ and FIG. B shows laser beams passing through a virtual optical path P3" and an actual optical path P3' towards the same direction.
Figures 8A, 8B:
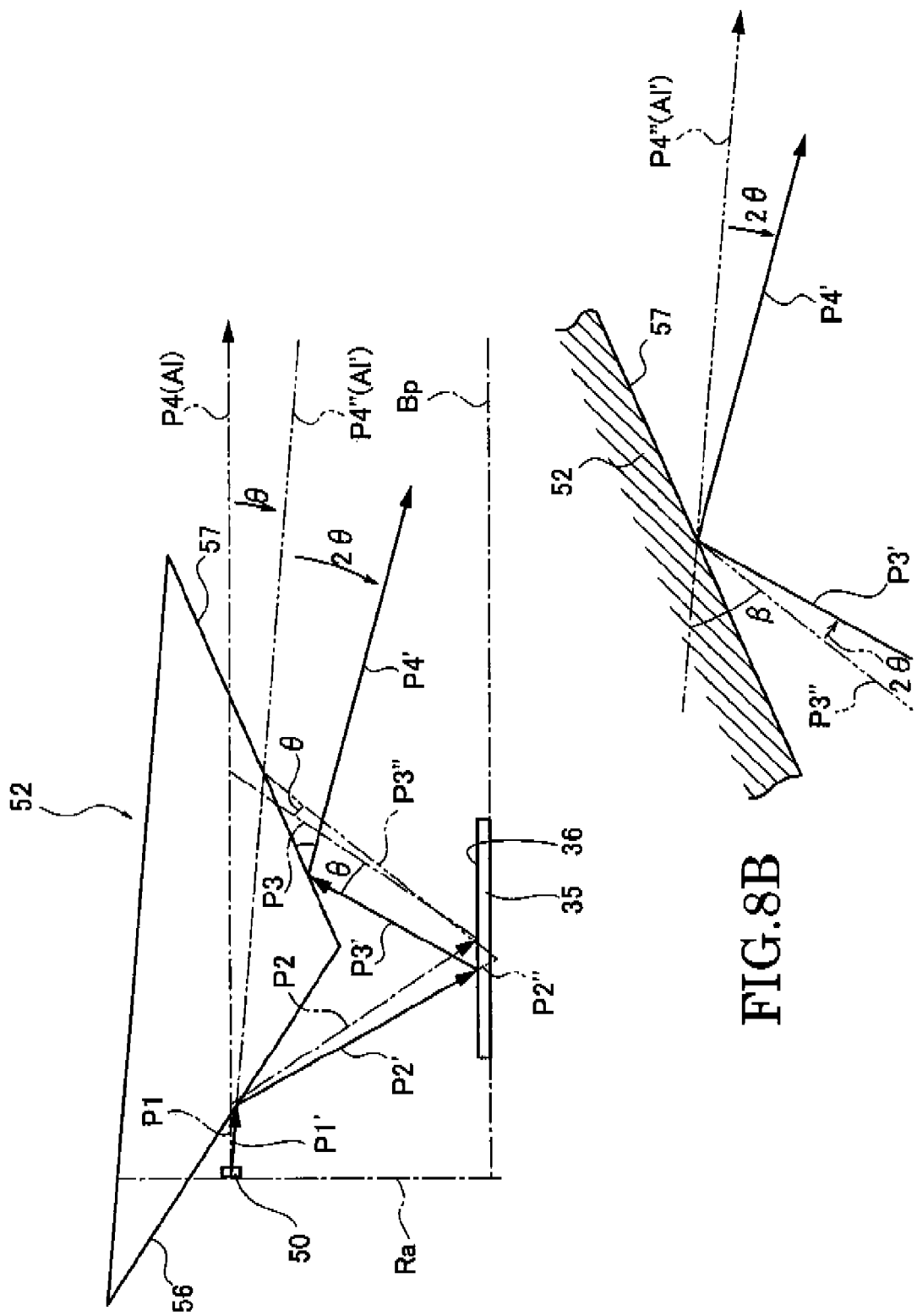
FIG. 8A shows the beam emitting unit of the rotary laser beam emitter when the optical axis is inclined by an angle −θ and FIG. 8B shows laser beams passing through a virtual optical path P3" and an actual optical path P3' towards the same position.
Figure 9:
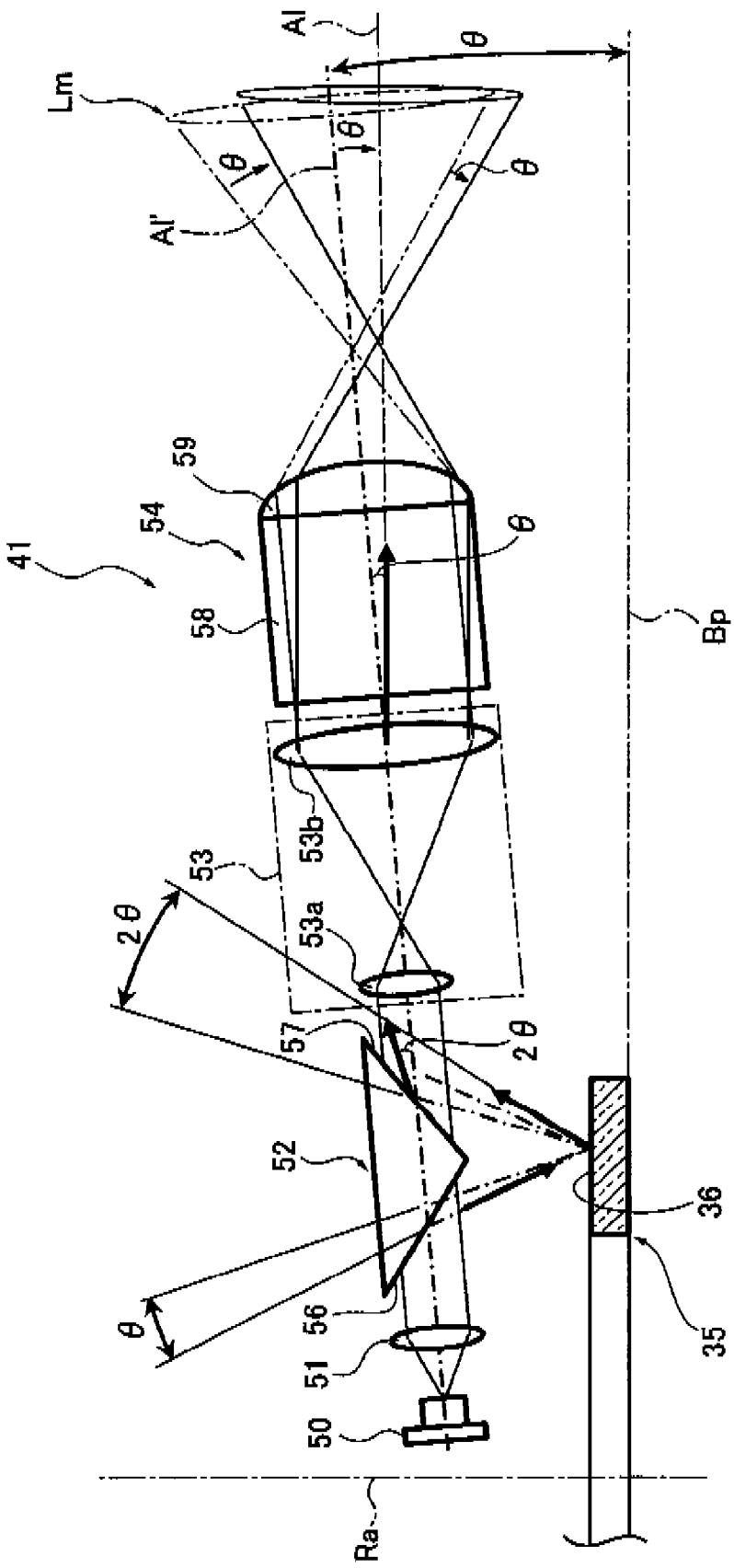
FIG. 9 shows the beam emitting unit when the optical axis is inclined by an angle θ.

FIG. 6 to FIG. 8 show optical action of the beam emitting unit 41 of the rotary laser beam emitter 10 according to the first embodiment. FIG. 6 shows the beam emitting unit 41 is in a reference state, FIG. 7 shows the same when the optical axis Al is inclined by angle +θ, and FIG. 8 shows the same when the optical axis Al is inclined by angle −θ. FIG. 9 shows the structure of the beam emitting unit when the optical axis is inclined by angle +θ. Note that inclination angle of the optical axis Al, size of the on-axis reflector 52 and the like are emphatically rendered for better understanding in FIG. 6 to FIG. 8 and they are different from those of the actual beam emitting unit 41. Also, therein optical paths P of a laser beam on the optical axis Al from the LD 50 are shown. In FIGS. 7, 8 the inclined optical axis Al by ±θ is referred to as Al'.

With no change in the rotary posture (hereinafter, reference state) of the rotary element 12 to the rotary axis Ra, the optical axis Al of the beam emitting unit 41 configured above is parallel to the reference plane Bp defined by the top wall (FIG. 1) 33 of the inner cylinder 19 as in FIG. 6. The laser beam from the LD 50 travels on the optical axis Al to the first reflective face 56 of the on-axis reflector 52 (optical path P1).

The laser beam reflected by the first reflective face 56 travels to the reflective face 36 of the ring-like mirror 35 (optical path P2) and an angle between the optical path P2 and the optical axis Al is an angle β.

The laser beam reflected by the reflective face 36 travels to the second reflective face 57 of the on-axis reflector 52 (optical path P3). In the reference state the reference plane Bp and the optical axis Al are parallel to each other and so are the optical axis Al and the reflective face 36 so that the optical path P3 and the reflective face 36 or the reference plane Bp makes an angle β.

The laser beam is reflected by the second reflective face 57 and travels on the optical axis Al to the beam expander 53 (FIGS. 2, 3) (optical path P4). In the following the optical paths P1 to P4 are referred to as reference paths (with no change in the rotary posture of the rotary element 12).

A change in the rotary posture of the rotary element 12 relative to the rotary axis Ra is described. In FIG. 7A the exit direction of the laser beam is inclined upward by an elevation angle θ from that in the reference state. The rotary posture of the rotary element 12 is inclined to the rotary axis Ra by an angle θ. Such an inclination does not affect the reference plane Bp defined by the top wall 33 of the inner cylinder 19, however, the optical axis Al of the beam emitting unit 41 contained in the rotary element 12 is inclined by the angle θ to the reference plane Bp. In the following actual optical paths P1' to P4' in the inclined state and virtual optical paths P1" to P4" inclined by the angle θ to the actual optical paths are assumed. The actual optical path P1' is inclined by the angle θ to the reference path P1 and the actual optical path P2' reflected by the first reflective face 56 is inclined by the angle θ to the reference path P2. The virtual optical paths P1", P2" coincide with the actual optical paths P1', P2', respectively.

The ring-like reflective face 36 is parallel to the reference plane Bp as in the reference state and makes the angle θ with the inclined optical axis Al'. Accordingly, the actual optical path P3' reflected by the reflective face 36 is inclined by the angle θ to the reference path P3 and by an angle 2θ to the virtual optical path P3" which is inclined by the angle θ to the reference path P3.

FIG. 7B shows a virtual laser beam having passed through the virtual optical path P3" and the actual optical path P3' and traveling to the same point on the second reflective face 57 of the on-axis reflector 52 of the beam emitting unit 41. Since the virtual optical path P3" is inclined by the angle θ to the reference path, it makes an angle β (FIG. 6) with the virtual optical path P4" reflected by the second reflective face 57. The virtual optical path P4" coincides with the optical axis Al'. The actual optical path P3' is inclined by the angle 2θ relative to the virtual optical path P3" so that the actual optical path P4 reflected by the second reflective face 57 is inclined by the angle 2θ relative to the virtual optical path P4". The angular relation between the actual optical path P4' and the virtual optical path P4" is invariable irrespective of in what position of the second reflective face 57 they are reflected. Therefore, the actual optical path P4' is inclined by the elevation angle 2θ to the optical axis Al'.

Thus, when an inclination of the rotary posture of the rotary element 12 by the angle θ to the rotary axis Ra, the laser beam from the LD 50 is inclined by the elevation angle 2θ relative to the optical axis Al' and incident on the beam expander 53 (FIGS. 2, 3) in the beam emitting unit 41.

The beam expander 53 is configured to have the angular magnification of 1/2, so that the laser beam is incident on the lens 53a at the angle 2α and emitted from the lens 53b at the angle −α to the optical axis Al' (FIG. 4). Accordingly, a laser beam incident on the beam expander 53 at the elevation angle 2θ is emitted from the beam expander 53 (FIGS. 2, 3) at a depression angle θ (−θ) relative to the optical axis Al'. The optical axis Al' is inclined by the elevation angle θ to the reference plane Bp so that the laser beam emitted from the beam expander 53 is parallel to the reference plane Bp.

Further, FIG. 8 shows the rotary element 12 whose rotary posture is inclined by the angle −θ to the rotary axis Ra, causing the laser beam to be emitted at the angle θ in a downward direction (depression angle) compared with the laser beam in the reference state. In this case, the laser beam is inclined in a vertically reverse direction (rotary axis Ra direction) relative to the reference path. The actual optical path P1' is inclined by the angle θ to the reference path P1, the actual optical path P2' is inclined by the angle θ to the reference path P2, and the actual optical path P3' is inclined by the angle θ to the reference path P3 and by the angle 2θ to the virtual optical path P3". The actual optical path P4" is inclined by the angle 2θ to the virtual optical path P4" and by the depression angle 2θ to the optical axis Al'.

When emitted downwards from the LD 50 at the angle θ, the laser beam is incident on the beam expander 53 (FIGS. 2, 3) at the depression angle 2θ relative to the optical axis Al' and emitted therefrom at the elevation angle θ relative to the optical axis Al'. The optical axis Al' is inclined by the depression angle θ to the reference plane Bp so that the laser beam emitted from the beam expander 53 is parallel to the reference plane Bp.

Accordingly, in the rotary laser beam emitter 10 according to the first embodiment, even with the inclination of the rotary element 12 by the angle θ as in FIG. 9, the laser beam Lm, emitted via the beam expander 53, is always parallel to the reference plane Bp. The collimator lens 51, on-axis reflector 52, beam expander 53, and beam shaping system 54 function as an optical emission system to emit a laser beam from the LD 50 on the optical axis Al in parallel to the reference plane Bp. The on-axis reflector 52 functions as an optical reflector, and the collimator lens 51 as an optical parallel element and the beam expander 53 function as an optical neutralizer.

The rotary posture of the rotary element 12 relative to the rotary axis Ra changes due to an allowance of such assembled elements as the base 40 rotatably supported by the inner cylinder 19 via the bearing element 43 and due to a deformation and a deflection of the elements. Therefore, the inclination angle θ of the rotary posture relative to the rotary axis Ra is extremely small and so is the inclination angle 2θ of the laser beam incident on the beam expander 53 relative to the optical axis Al'. Accordingly, the relation between the incidence angle and exit angle of the laser beam to the beam expander 53 applies all of the laser beams reflected by the second reflective face 57 and incident on the beam expander 53.

In the following, the advantageous effects of the rotary laser beam emitter 10 according to the first embodiment are described.

(1) Irrespective of a change or no change in the rotary posture of the rotary element 12 to the rotary axis Ra, the rotary laser beam emitter 10 can emit the laser beams (laser beam Lm) in parallel to the reference plane Bp around the rotary axis Ra in 360 degrees. Therefore, it is able to totally prevent a decrease in measurement accuracy due to a change in the rotary posture of the rotary element 12. That is, the traveling direction of the laser beam Lm can be set by the reference plane Bp. For placing the rotary laser beam emitter 10 at the known point, the inner cylinder 19 is adjusted to have no inclination by the pair of tilt sensors 32 of the level adjusting system 22 to allow the reference plane Bp defined by the top wall 33 of the inner cylinder 19 to become parallel to a level plane. This makes it possible for the rotary laser beam emitter 10 to emit the laser beam Lm in parallel to the level plane without fail and accurately survey target positions.

(2) The rotary laser beam emitter 10 can emit three laser beams Lm in a direction parallel to the reference plane Bp without fail irrespective of a change or no change in the rotary posture of the rotary element 12 relative to the rotary axis Ra since the beam emitting unit 41 includes the beam shaping system 54 which splits the laser beam having passed through the beam expander 53 into three and shapes them.

(3) The rotary laser beam emitter 10 has such a simple structure to emit a laser beam in parallel to the reference plane Bp optically by cooperation of the on-axis reflector 52, ring-like reflective face 36 parallel to the reference plane Bp, and beam expander 53. This enables efficient use of the laser beam from the LD 50 and an increase in outputs of the laser beam Lm. Therefore, with use of an optical receiver having a known reception performance, it is possible to widen a measurable area. Further, even with use of an optical receiver with a lower reception performance, it is possible to secure a general measurable area. It is accordingly made possible to reduce an effective diameter of an optical receiver and downsize the optical receiver.

(4) Owing to the beam emitting unit 41 contained in the rotary element 12 rotating around the rotary axis, it is possible to reduce a deviation in measurement accuracy of the vertical angle caused by an exit direction of the laser beam Lm. The prior art rotary laser beam emitter with a beam emitting unit comprises a plurality of pentaprisms arranged on the rotary axis and a light source emitting a laser beam to the pentaprisms. Since the pentaprisms are rotated, there occurs unevenness in light amount of the laser beam from the light source and the unevenness changes depending on a rotating beam direction. This may cause a deviation in the measurement accuracy of the vertical angle depending on the rotating beam direction. To the contrary, the rotary laser beam emitter 10 according to the first embodiment is configured that the beam emitting unit 41 including the LD 50 is rotated around the rotary axis Ra, so that the unevenness in light amount can be constant irrespective of the rotating beam direction. That is by rotation of the beam emitting unit 41 around the rotary axis Ra, the rotary laser beam emitter 10 can prevent a deviation in the measurement accuracy even with unevenness in the intensity of the laser beam Lm in such a case that beam profile (beam shape in cross section orthogonal to the optical axis direction) of the laser beam is not circular or spread angle of the laser beam is not constant.

(5) The rotary laser beam emitter 10 can reliably emit the laser beams Lm to measure a target position in parallel to the reference plane irrespective of the rotary posture of the rotary element since the laser beams from the LD 50 are collimated by the collimator lens 51 before reaching the on-axis reflector 52. Moreover, even with a change in the interval between the beam emitting unit 41 and the ring-like reflective face 36, the set focal lengths on the optical paths of the beam emitting unit 41 can be prevented from being affected.

(6) The on-axis reflector 52 forming the first and second reflective faces 56, 57 is simply structured of a columnar element whose vertical cross section is an isosceles triangle.

(7) The reference reflector is formed as the reflective face 36 of the ring-like mirror 35 with a simple structure so that it can cooperate with the on-axis reflector 52 to form the optical paths P2, P3 irrespective of the rotary position of the rotary element 12 around the rotary axis Ra.

(8) The beam emitting unit 41 includes the beam shaping system 54 comprising the three prism blocks 58a, 58b, 58c arranged in parallel to the reference plane Bp to split the laser beam into three and shape them. This enables a size reduction of the rotary element 12 in the level plane and also enables the beam emitting unit 41 to always emit three laser beams Lm in parallel to the reference plane Bp. Furthermore, owing to the size reduction of the rotary element 12, it is possible to reduce a change in the rotary posture of the rotary element 12.

(9) The container 42 includes the through hole 42c into which the support shaft 34 of the inner cylinder 19 is inserted so that the top end (mount 37) of the support shaft 34 protrudes from the top wall 42a while the base 40 is rotatably supported on the inner cylinder 19. Because of this, the mount 37 on the top end of the support shaft 34 does not rotate along with the container 42 or the rotary element 12 relative to the inner cylinder 19. Accordingly, the container 42 can securely support another measuring device (radio unit 38 in the present embodiment) above the beam emitting unit 41.

(10) The beam emitting unit 41 is configured that a laser beam from the LID 50 is collimated by the collimator lens 51 and then reflected by the reflective face 36 as a reference reflective face. Therefore, it is able to properly emit the laser beam Lm in parallel to the reference plane Bp when the rotary posture of the rotary element 12 is changed relative to the rotary axis Ra.

(11) The beam shaping system 54 of the beam emitting unit 41 is set so that the traveling directions Cra, Crb, Crc of the respective laser beams Sa, Sb, Sc intersect with one another at the same position on the rotary axis Ra. Thus, the laser beams Sa, Sb, Sc of the laser beam Lm are emitted from the rotary laser beam emitter 10 in rotation as if they are emitted from the same point light source (rotary axis Ra). This makes it possible to easily and more accurately calculate measurements for surveying a target position from the time interval of the light receiving signals output from the laser beam receiver 65 receiving the laser beam Lm.

As described above, the rotary laser beam emitter 10 according to the first embodiment can prevent a variation in the exit direction of the laser beam from the beam emitting unit 41 provided in the rotary element 12 relative to the rotary axis Ra.

Second Embodiment

Next, a rotary laser beam emitter 102 according to the second embodiment will be described with reference to FIGS. 10, 11. The rotary laser beam emitter 102 is different from the rotary laser beam emitter 10 according to the first embodiment in the structure of a beam emitting unit 412. The basic structure thereof is the same as the rotary laser beam emitter 10, therefore, the same elements are given the same numeric codes and a detailed description thereof is omitted.

Figure 10:
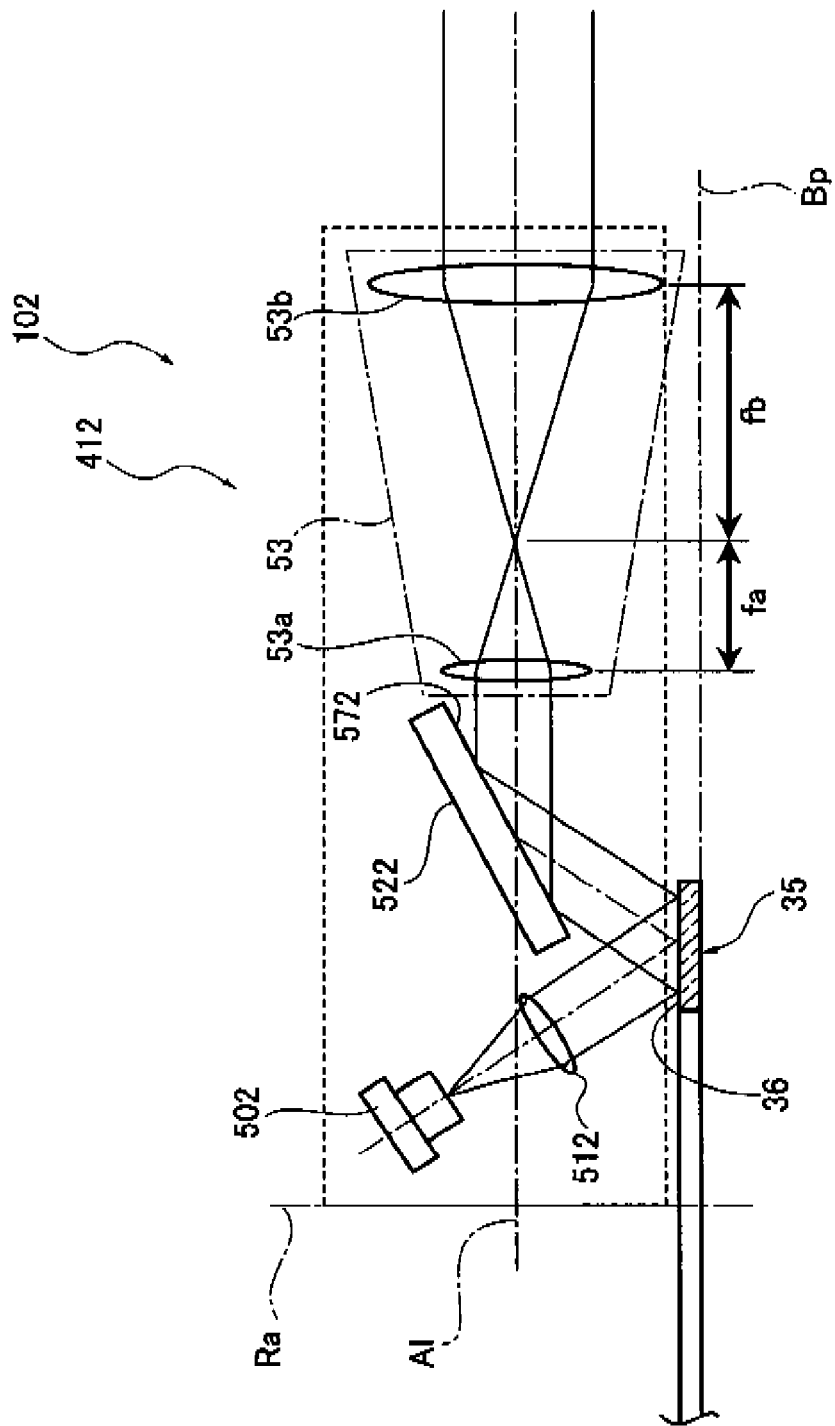
FIG. 10 schematically shows the structure of a beam emitting unit of a rotary laser beam emitter according to a second embodiment.
Figure 11:
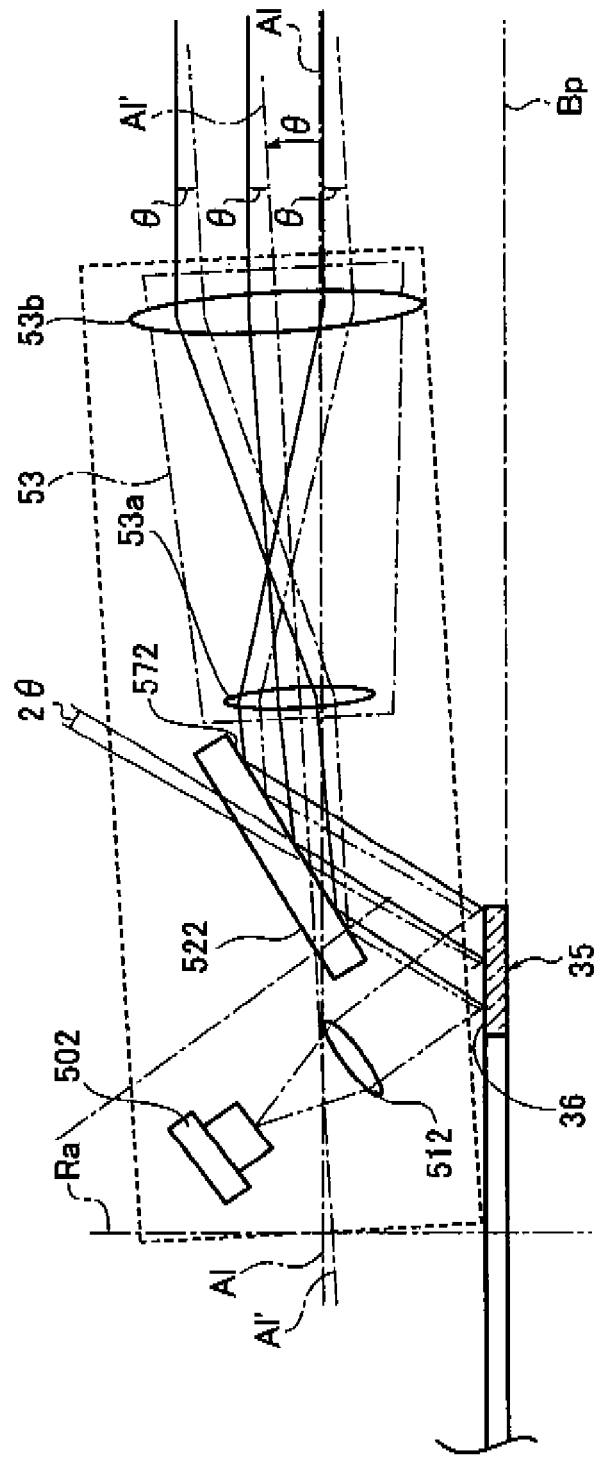
FIG. 11 shows the structure of the beam emitting unit according to the second embodiment when the optical axis is inclined by an angle θ.

FIG. 10 schematically shows a beam emitting unit 412 of the rotary laser beam emitter 102 according to the second embodiment and FIG. 11 shows the optical axis Al of the beam emitting unit 412 inclined by angle θ. In FIG. 11 the optical axis Al of the beam emitting unit 41 is assumed to be inclined by angle θ when the intersection of the optical axis Al and the optical axis of an LD 502 is the center of rotation for better understanding.

As shown in FIG. 10, in the beam emitting unit 412 an optical path of a laser beam from the LD 502 to the reflective face 36 is different from that in the beam emitting unit 41 in the first embodiment. Specifically, the LD 502 is disposed not on the optical axis Al but to be inclined relative to the reference plane Bp so that the ring-like reflective face 36 is positioned on the traveling direction of the principal ray. A collimator lens 512 is placed on the traveling direction of the principal ray between the LD 502 and the reflective face 36. Therefore, an on-axis reflector 522 includes only a second reflective face 572 in the beam emitting unit 412.

The laser beam from the LD 502 passes through the collimator lens 512 to be a parallel beam. The parallel beam is reflected by the reflective face 36 to a second reflective face 572 of the on-axis reflector 522. The laser beam is reflected by the second reflective face 572 on the optical axis Al to the beam expander 53. Thus, in the beam emitting unit 412 the LD 502 and the collimator lens 512 are disposed on an optical path (P2 in FIG. 6) from the first reflective face 56 to the reflective face 36.

As shown in FIG. 11, the rotary laser beam emitter 102 can always emit the laser beam Lm via the beam expander 53 in parallel to the reference plane Bp even with an inclination of in the rotary posture of the rotary element 12 by angle θ relative to the rotary axis Ra, as the rotary laser beam emitter 10 according to the first embodiment. In FIG. 11 the actual optical paths of the laser beam are indicated by a solid line while virtual optical paths inclined by angle θ to the reference paths are indicated by a dashed two dotted line.

The rotary laser beam emitter 102 can attain the same effects of the rotary laser beam emitter 10 in the first embodiment. In addition, the beam emitting unit 412 can be downsized since the on-axis reflector 52 forming only the second reflective face 572 is used. Also, the LD 502 and the collimator lens 512 are placed on the optical path P2 (FIG. 6) of the beam emitting unit 41 so that it is able to reduce the size of the beam emitting unit 412 in the level plane. Accordingly, this can further reduce a change in the rotary posture of the rotary element 12 relative to the rotary axis Ra.

Third Embodiment

Next, a rotary laser beam emitter 103 according to the third embodiment is described with reference to FIGS. 12-14. In the third embodiment a beam emitting unit 413 (optical reflector) is configured that a laser beam is reflected by the reflective face 36 twice while the beam emitting unit 41 in the first embodiment is configured that a laser beam is reflected thereby once. The structure of the rotary laser beam emitter 103 is basically the same as that of the rotary laser beam emitter 10 of the first embodiment, and the same elements are given the same numeric codes, therefore, a detailed description thereof will be omitted.

Figure 12:
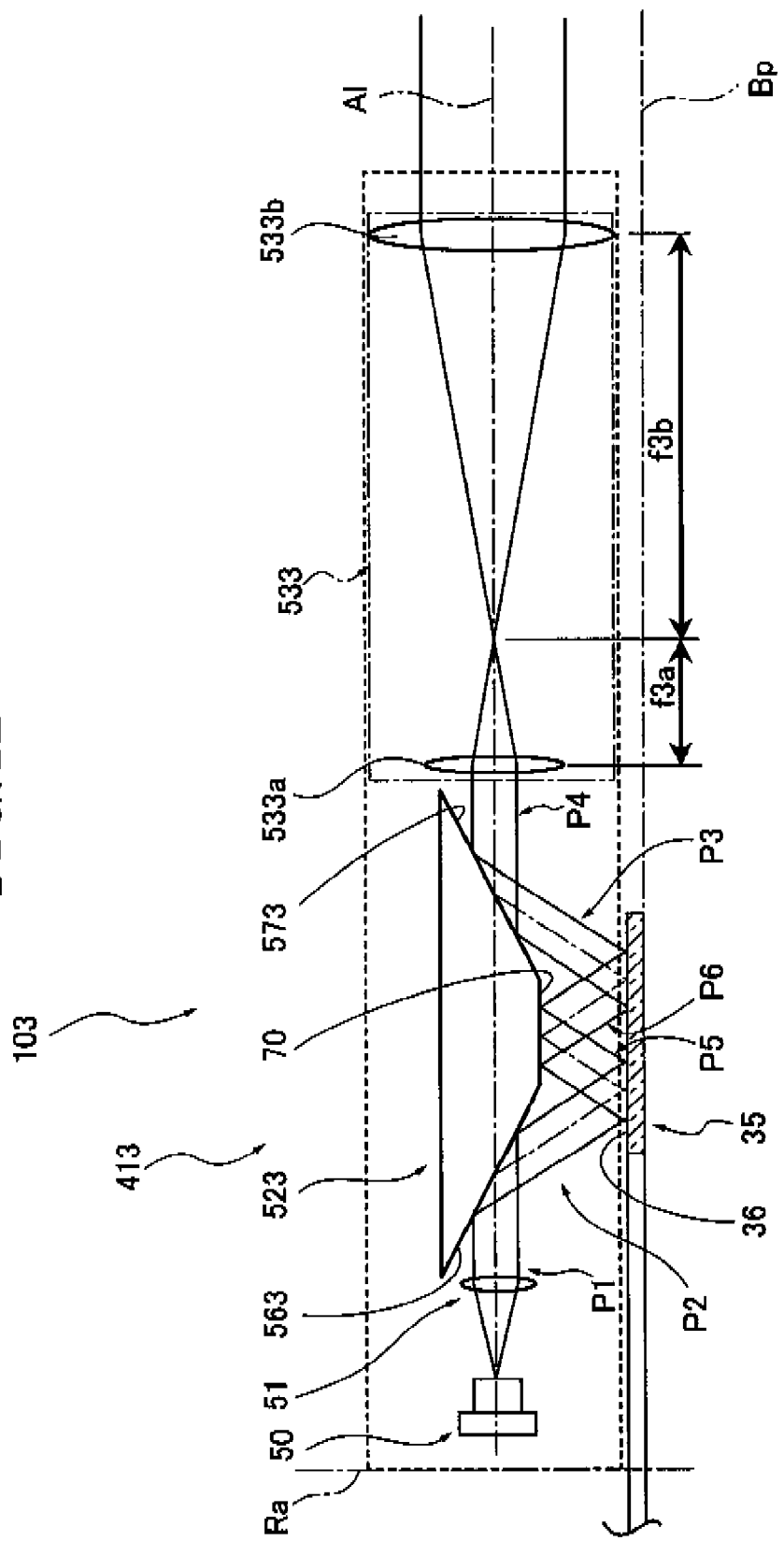
FIG. 12 schematically shows the structure of a beam emitting unit of a rotary laser beam emitter according to a third embodiment.
Figures 13A, 13B:
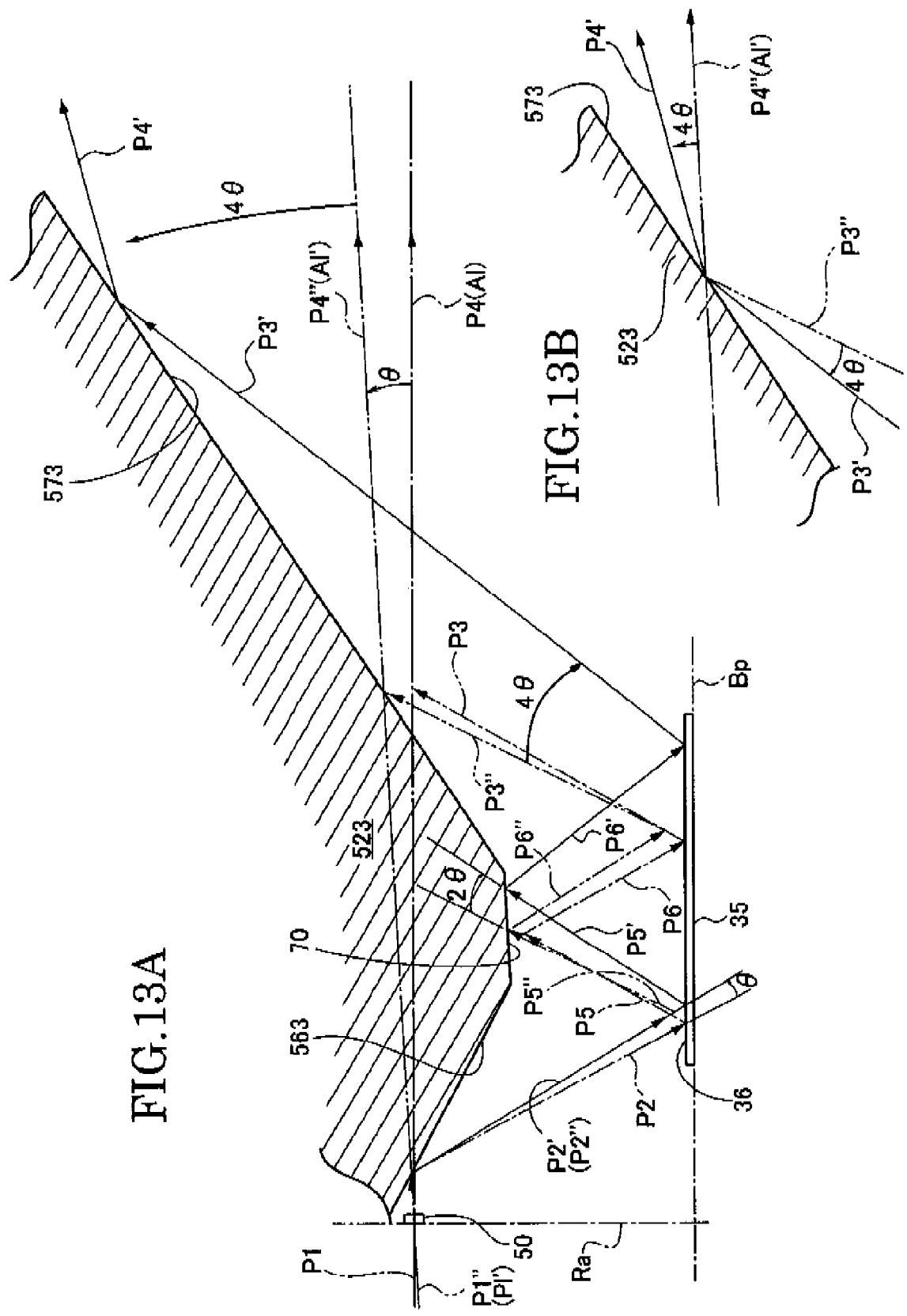
FIG. 13A shows the beam emitting unit according to the third embodiment when the optical axis Al is inclined by an angle θ and FIG. 13B shows laser beams passing through a virtual optical path P3" and an actual optical path P3' towards the same position.
Figure 14:
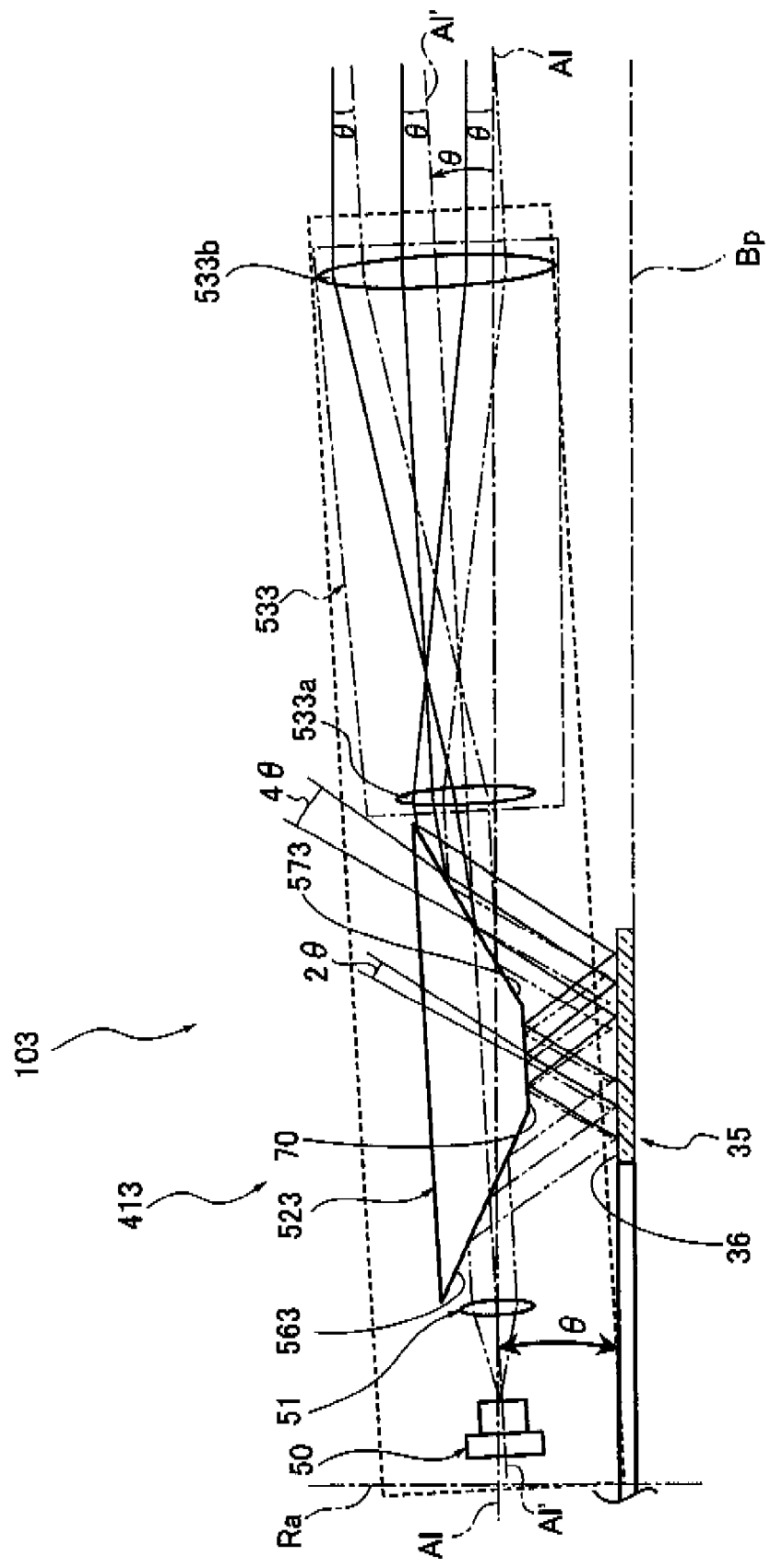
FIG. 14 shows the beam emitting unit according to the third embodiment when the optical axis Al is inclined by an angle θ.

FIG. 12 schematically shows the structure of the beam emitting unit 413 of the rotary laser beam emitter 103 according to the third embodiment, FIG. 13A shows optical action of the beam emitting unit 413 when the optical axis Al is inclined by an angle θ and FIG. 13B shows laser beams passing through a virtual optical path P3" and an actual optical path P3' and reflected by the same position on the second reflective face 573, and FIG. 14 shows the optical action of the beam emitting unit 413 when the optical axis Al is inclined by an angle θ. In FIGS. 13A, 13B inclination angle of the optical axis Al, size of the on-axis reflector 52 and the like are emphatically rendered for better understanding and they are different from those of the actual beam emitting unit 413. Also, FIGS. 13A, 13B show optical paths P of the laser beams from the LD 50 on the optical axis Al and an inclined optical axis Al' by angle θ (−θ). In FIG. 14 the optical axis Al' of the beam emitting unit 413 is assumed to be inclined by angle θ when the intersection of the optical axis Al of the beam emitting unit 413 and a first reflective face 563 of an on-axis reflector 523 is the center of rotation.

In the beam emitting unit 413 the on-axis reflector 523 and a beam expander 533 are differently configured from those of the beam emitting unit 41 in the first embodiment, as shown in FIG. 12.

The on-axis reflector 523 comprises a first reflective face 563 facing the LD 50, a second reflective face 573 facing the beam expander 533, and a third reflective face 70 facing the ring-like reflective face 36. A laser beam from the LD 50 is collimated to be a parallel beam by the collimator lens 51 (optical path P1). The first reflective face 563 reflects the parallel beam to the reflective face 36 of the ring-like mirror 35 on the reference plane Bp of the inner cylinder 19 via the through hole 48 (FIG. 1) of the container 42 (optical path P2) as the first reflective face 56 in the first embodiment. The second reflective face 573 reflects the laser beam reflected by the reflective face 36 and having passed through the through hole 48 (optical path P3) to the beam expander 533 (optical path P4) as the second reflective face 57 in the first embodiment.

The third reflective face 70 is set to be parallel to the reflective face 36 or the reference plane Bp while the optical axis Al is parallel to the reference plane Bp of the inner cylinder 19 (reference state). The laser beam is reflected by the first reflective face 563 and the reflective face 36 of the ring-like mirror 35 and passes through the through hole 48 of the container 42 (optical path P5). The third reflective face 70 reflects the laser beam again to the reflective face 36 via the through hole 48 (optical path P6). The laser beam reflected by the third reflective face 70 is reflected by the reflective face 36 to pass through the through hole 48 (P3) and be reflected by the second reflective face 573 (P4). The optical paths P1 to P6 are referred to as reference paths when the rotary posture of the rotary element 12 coincides with the rotary axis Ra.

Next, an example in which the rotary element 12 is inclined upwards by elevation angle θ to the laser beam in the reference state is described with reference to FIGS. 13A, 13B and FIG. 14. A change in the rotary posture of the rotary element 12 to the rotary axis Ra does not affect the reference plane Bp defined by the top wall 33 of the inner cylinder 19, however, the optical axis Al of the beam emitting unit 413 contained in the rotary element 12 is inclined by the angle θ to the reference plane Bp. In the following, actual optical paths P1' to P6' in the inclined state and virtual optical paths P1" to P6" inclined by the angle θ to the reference paths are assumed as in FIG. 13. The actual optical path P1' is inclined by the angle θ to the reference path P1 and the actual optical path P2' reflected by the first reflective face 563 is also inclined by the angle θ to the reference path P2. The virtual optical paths P1", P2" coincide with the actual optical paths P1', P2', respectively.

Here, the ring-like reflective face 36 is parallel to the reference plane Bp and makes an angle θ with the optical axis Al'. Therefore, the actual optical path P5' reflected by the reflective face 36 is inclined by the angle θ to the reference path P5 and by the angle 2θ relative to the virtual optical path P5". The third reflective face 70 of the on-axis reflector 523 is parallel to the optical axis Al' and makes an angle θ with the reflective face 36. The actual optical path P6' reflected by the third reflective face 70 is inclined by angle 3θ relative to the reference path P6 and by the angle 2θ relative to the virtual optical path P6" which is inclined by the angle θ to the reference path P5. The actual optical path P3' reflected by the reflective face 36 is inclined by angle 3θ to the reference path P3 and by an angle 4θ to the virtual optical path P3" inclined by the angle θ to the reference path P3.

FIG. 13B shows laser beams passing through the virtual optical path P3" and the actual optical path P3' to the same position of the second reflective face 573 of the on-axis reflector 523 inclined by the angle θ. Since the virtual optical path P3" is inclined by the angle θ to the reference path P3, the virtual optical path P4" after the virtual optical path P3" reflected by the second reflective face 573 coincides with the optical axis Al' inclined by the angle θ to the reference optical axis Al.

Meanwhile, the actual optical path P3' and the virtual optical path P3" are reflected by the same position of the second reflective face 573 and the actual optical path P3' is inclined by the angle 4θ to the virtual optical path P3" so that the actual optical path P4' reflected thereby is also inclined by the angle 4θ relative to the virtual optical path P4". The angular relation between the actual optical path P4' and the virtual optical path P4" is invariable irrespective of in what position of the second reflective face 573 they are reflected. Therefore, the actual optical path P4' is inclined by the elevation angle 4θ to the optical axis Al'.

With an upward inclination of the rotary element 12 by the elevation angle θ relative to the rotary axis Ra, a laser beam from the LD 50 is incident on the beam expander 533 at the elevation angle 4θ relative to the optical axis Al' in the beam emitting unit 413 (FIGS. 12, 14).

In the beam emitting unit 413 the ratio of focal lengths f3a (lens 533b side) and f3b (lens 533a side) of the lens 533a and lens 533b of the beam expander 533 is set to 1 to 4 and the angular magnification of the beam expander 533 is set to 1/4. Because of this, in the beam expander 533a laser beam is incident on the lens 533a at angle 4θ and emitted from the lens 533b at angle −θ relative to the optical axis.

Thus, when the optical axis Al is inclined upwards at elevation angle θ, a laser beam is incident on the beam expander 533 at elevation angle 4θ relative to the optical axis Al' and emitted downwards therefrom at depression angle θ(−θ). The optical axis Al' is inclined to the reference plane Bp by elevation angle θ so that the laser beam emitted from the beam expander (FIGS. 2, 3) becomes parallel to the reference plane Bp. This also holds true when the rotary posture of the rotary element 12 is inclined to the rotary axis Ra and an exit direction of the laser beam is inclined by depression angle θ (angle −θ), as in the beam emitting unit 41 of the first embodiment.

According to the rotary laser beam emitter 103, even with an inclination of the rotary element 12 by angle θ relative to the rotary axis Ra, the beam expander 533 can emit the laser beam Lm in parallel to the reference plane Bp without fail.

Accordingly, the rotary laser beam emitter 103 in the third embodiment can achieve the same effects as those of the rotary laser beam emitter 10 in the first embodiment.

Note that the beam emitting unit 413 is configured to reflect a laser beam twice on the reflective face 36. However, the present invention is not limited to such a configuration. It can be configured to reflect a laser beam at arbitrary number of times on the ring-like reflective face 36 as long as the reflective face 36 is provided on the reference plane Bp which is not affected by an inclination of the rotary element 12 relative to the rotary axis Ra. With the number of reflections by the ring-like reflective face 36 being k and the inclination angle θ of the optical axis Al, for example, the laser beam is incident on the beam expander 533 at inclination angle 2kθ relative to the optical axis Al'. Accordingly, the beam expander having the angular magnification 1/2 k can always emit the laser beam Lm in parallel to the reference plane Bp for measuring a target position, irrespective of the rotary posture of the rotary element 12.

Fourth Embodiment

Next, a rotary laser beam emitter 104 according to the fourth embodiment will be described with reference to FIGS. 15 to 17. The rotary laser beam emitter 104 is different from the rotary laser beam emitter 10 according to the first embodiment in the structure of a beam emitting unit 414. The basic structure thereof is the same as the rotary laser beam emitter 10, therefore, the same elements are given the same numeric codes and a detailed description thereof is omitted.

Figure 15:
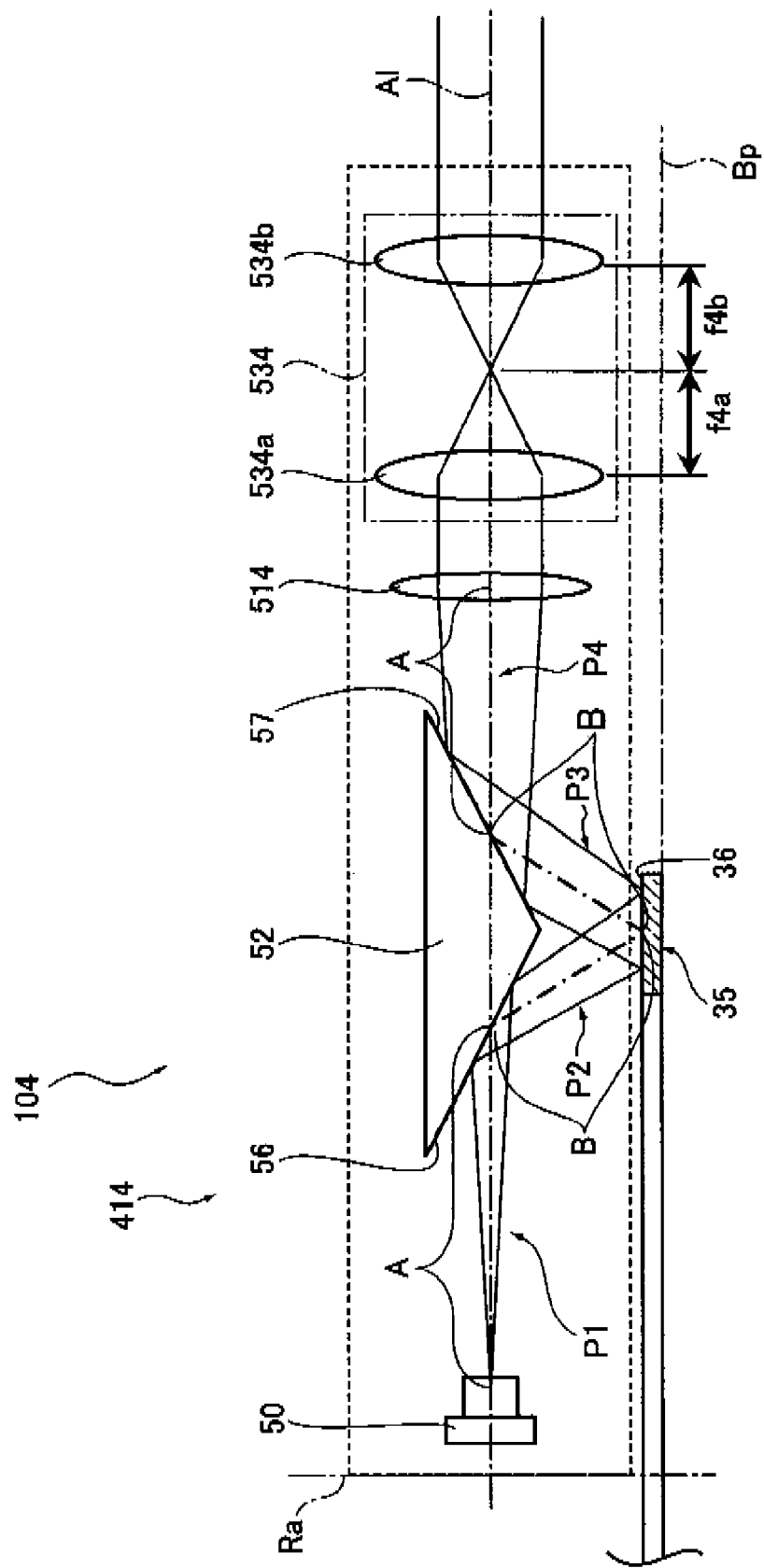
FIG. 15 schematically shows the structure of a beam emitting unit of a rotary laser beam emitter according to a fourth embodiment.
Figure 16:
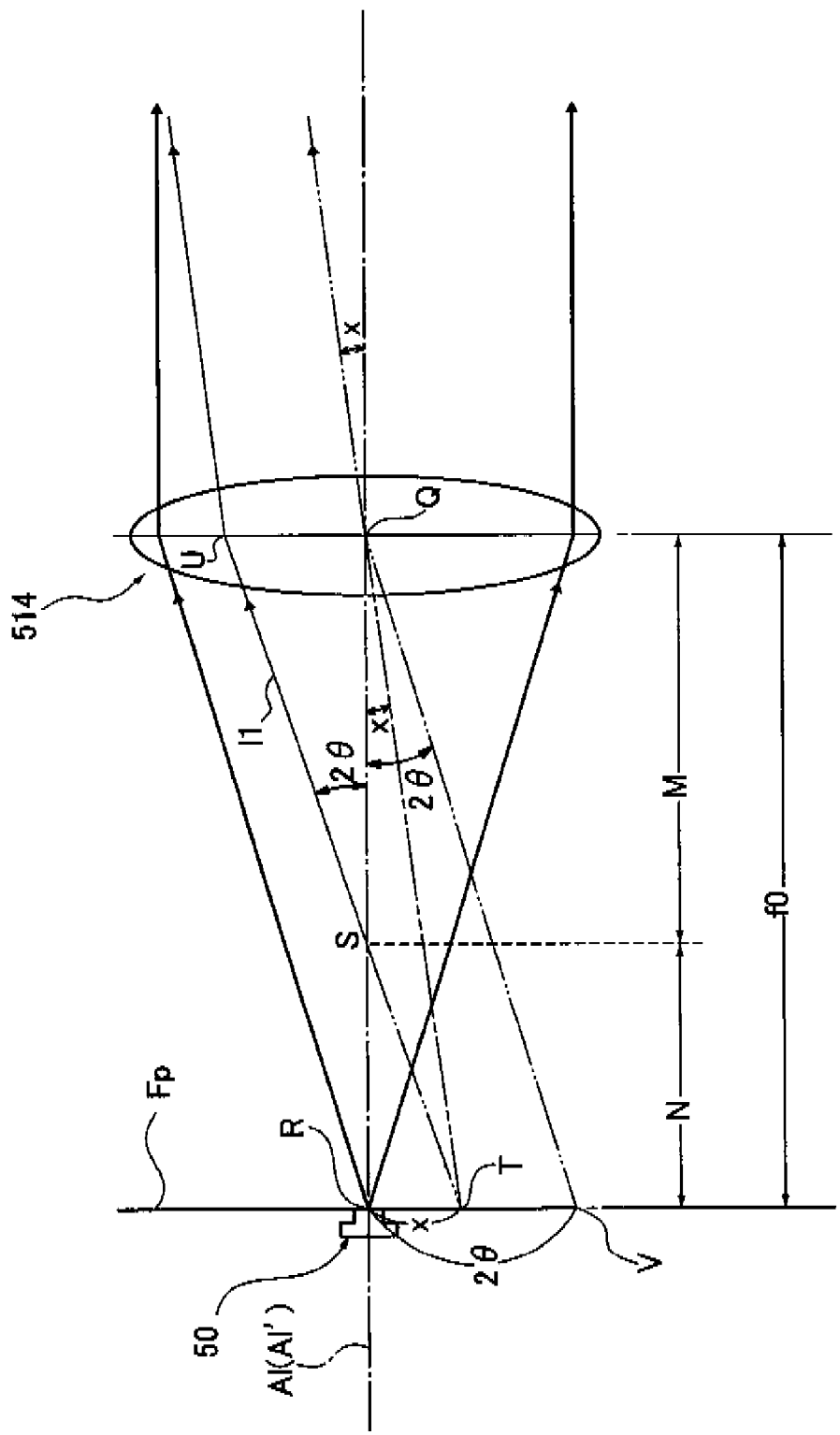
FIG. 16 shows an optical path from an LD to a collimator lens of the beam emitting unit in a simplified manner.

FIG. 15 schematically shows the structure of the beam emitting unit 414 of the rotary laser beam emitter 104 according to the fourth embodiment and FIG. 16 shows the basic lens action of the beam emitting unit 414 using optical paths from the LD 50 to the collimator lens 514 in a simplified manner. FIG. 17 shows the beam emitting unit 414 whose optical axis Al is inclined by angle θ. In FIG. 17 the optical axis Al' is assumed to be inclined by angle θ when the intersection of the optical axis Al of the beam emitting unit 414 and the first reflective face 56 of the on-axis reflector 52 is the center of rotation for better understanding.

As shown in FIG. 15, a collimator lens 514 is placed at a different position and a beam expander 534 is differently configured, compared with those in the beam emitting unit 41 in the first embodiment.

In the beam emitting unit 414 the collimator lens 514 is disposed between the on-axis reflector 52 and the beam expander 534 on the optical axis Al. The collimator lens 514 is a lens having a focal length f0 (FIG. 16) so that the exit position of a laser beam from the LD 50 is to be a focal position on an optical path of the beam emitting unit 414. A laser beam is emitted from the LD 50 (optical path P1), reflected by the first reflective face 56 of the on-axis reflector 52 to the reflective face 36 of the ring-like mirror 35 (optical path P2), reflected thereby to the second reflective face 57 of the on-axis reflector 52 (optical path P3), and reflected thereby to the collimator lens 514 (optical path P4) which collimates the laser beam into a parallel beam. In the present embodiment the optical paths P1 and P4 have the same length A and the optical paths P2 and P3 have the same length B. The reflective face 36 is set to reflect a laser beam in the middle of the optical path from the LD 50 to the collimator lens 514 (M=N in FIG. 16), that is, a half of the focal length f0 from the collimator lens 514.

Now, with an inclination of the rotary element 12 relative to the rotary axis Ra by an angle θ (optical axis Al' in FIG. 17), a laser beam travels from the LD 50 to the collimator lens 514 as that in the beam emitting unit 41. Specifically, actual inclined optical paths P1' to P4' and virtual optical paths P1" to P4" inclined by angle θ to the reference path are assumed (FIGS. 7, 8). There is no difference in angle of inclination between the actual optical paths P1', P2' and the virtual optical paths P1", P2", respectively, however, there is between the actual optical paths P3', P4' and the virtual optical paths P3", P4" after reflected by the reflective face 36, respectively, by an angle 2θ. Thus, with the inclination angle θ of the rotary posture of the rotary element 12 relative to the rotary axis Ra, in the beam emitting unit 414 a laser beam is incident on the collimator lens 514 at inclination angle 2θ relative to the optical axis Al, which is depicted in a simplified manner in FIG. 16.

In FIG. 16 the LD 50 and the collimator Jens 51 are distanced away from each other with an interval of f0 as the focal length of the collimator lens 51 on the optical axis Al. The positional relation of the LD 50 and the collimator lens 51 to the optical axis Al' is constant in FIG. 16. With the inclination angle θ of the rotary element 12 relative to the rotary axis Ra, the optical axis Al of the laser beam is assumed to be not inclined (Al and Al' are indicated by the same line), and the laser beam is to start inclining at a point S relative to the optical axis Al' (Al).

The diffusive laser beam from the LD 50 is converted into a parallel beam by the collimator lens 514. FIG. 16 shows the center Q of the collimator lens 514, an exit position R of the LD 50, a reflective point S of the reflective face 36 on the optical path from the LD 50 to the collimator lens 514, and the focal plane Fp (including the focal point and orthogonal to the optical axis) of the collimator lens 514. A line S to U is a laser beam 11 from the point S inclined at an angle 2θ relative optical axis Al' (line Q to R) and incident on the collimator lens 514. In the drawing a length of the line Q to S is defined to be M and that of the line S to R is defined to be N.

Having passed through the collimator lens 514, the parallel beam 11 travels in a direction from an intersection T of an extension of the line S to U and the focal plane Fp to the center Q of the collimator lens 514 (in parallel to a line T to Q). Then, the parallel beam 11 at angle x relative to the optical axis Al' (line Q to R) travels to the beam expander 534 (FIGS. 15, 17).

Now, when an intersection of a line parallel to the laser beam 11 and on the center Q of the collimator lens 514 and the focal plane Fp is assumed to be a point V, the line Q to V is inclined to the optical axis Al' (line Q to R) by angle 2θ. In the present embodiment the inclination angle θ to the optical axis Al is an extremely small value so that an equation tanθ=θ (2θ) holds. Because of this, when comparing two triangles QRV and QRT with the same base, the ratio of angle 2θ of apex Q of the triangle QRV and angle x of that of the triangle QRT is equal to that of lengths of the lines R to V and R to T. Thus, in a triangle QRV including a side R to V and a triangle SRT including a side R to T, (line Q to R):(line R to V)=(line S to R):(line R to T) and (M+N):(2θ)=(N):(x) so that x=[2N/(M+N)]θ is established.

Therefore, in the beam emitting unit 414 configured above, a traveling direction of a parallel beam from the collimator lens 514 at angle x is determined by the point S or a reflective position on the reflective face 36. However, this holds true on the premise that the ratio of the length M (line S to Q) and that N (line S to R) does not change before (optical paths P1 to P4) and after (actual optical paths P1' to P4') the inclination of the rotary element. In the present embodiment this premise can hold true since a variation in the incidence angle of the laser beam is extremely small and so is a change in the ratio of the optical path lengths before and after the reflection.

As described above, in the beam emitting unit 414 the reflective position (point 5) on the reflective face 36 is set to be in the middle of the optical path from the LD 50 and the collimator lens 514. That is, length M=length N in FIG. 16 so that x=θ is established. With the rotary element 12 inclined by angle θ to the rotary axis Ra, a laser beam from the LU 50 is incident on the beam expander 534 (FIG. 17 and FIG. 18), inclined by angle θ to the optical axis Al' in the same direction as that of the inclination of the rotary element 12.

As shown in FIG. 15, in the beam expander 534 the ratio of the focal lengths f4a, f4b of the lens 534a and the lens 534b is set to 1 to 1 and the angular magnification is set to 1/1 (same angular magnification). Therefore, a laser beam is incident on the lens 534a at angle α and emitted from the lens 534b at angle −α relative to the optical axis.

Figure 17:
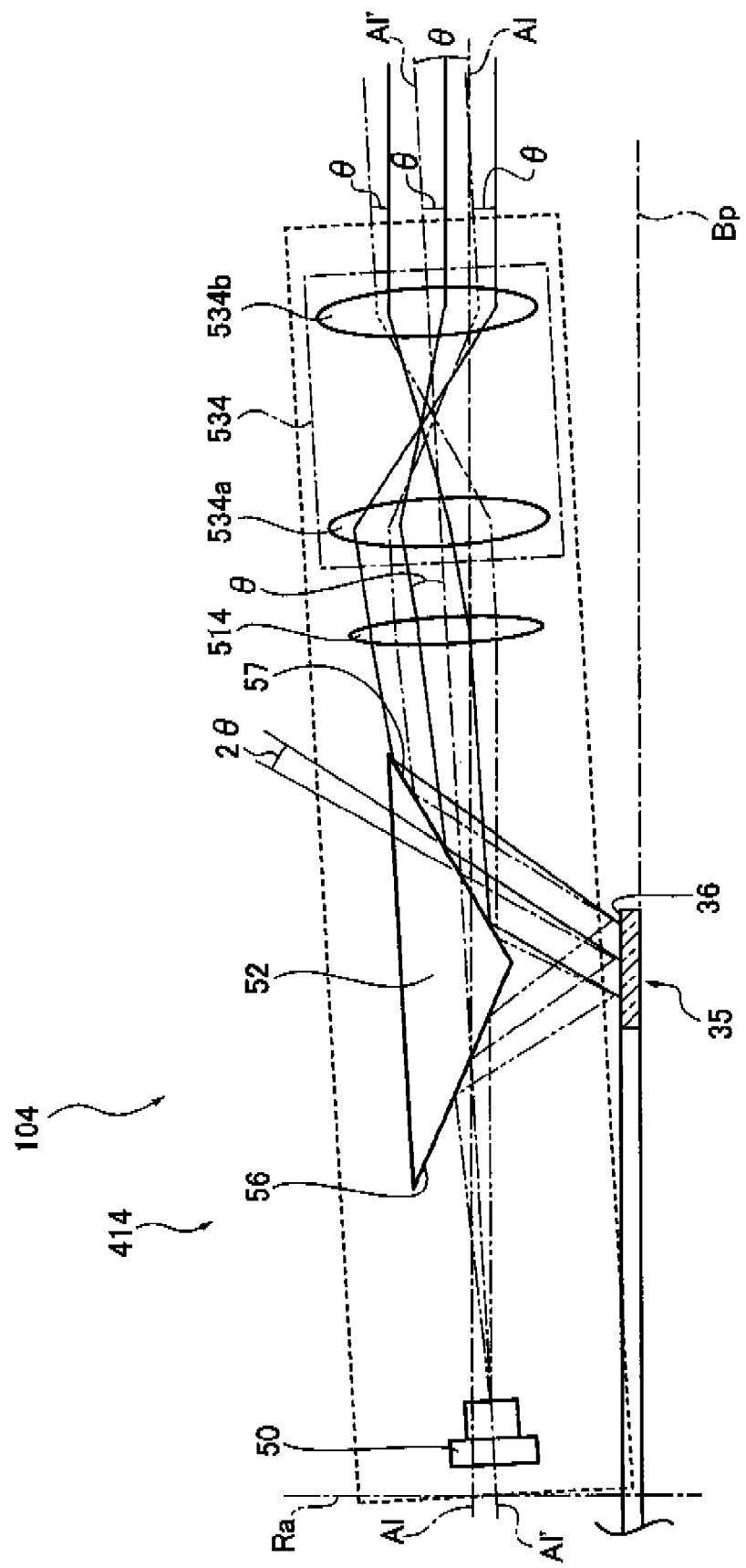
FIG. 17 shows the beam emitting unit when the optical axis Al is inclined by an angle θ.

Thus, with the inclination of the optical axis Al by elevation angle θ as shown in FIG. 17, a laser beam is incident on the beam expander 534 at elevation angle θ and emitted therefrom at depression angle θ (−θ) relative to the optical axis Al'. Since the optical axis Al' is inclined by elevation angle θ relative to the reference plane Bp, the laser beam from the beam expander 534 is parallel to the reference plane Bp. This also holds true when the rotary posture of the rotary element 12 is inclined to cause the optical axis Al to be inclined by depression angle θ' (−θ'), as in the beam emitting unit 41 in the first embodiment.

Accordingly, the rotary laser beam emitter 104 in the present embodiment can always emit a laser beam Lm in parallel to the reference plane Bp via the beam expander 534 for measuring a target position, even with the inclination of the rotary posture of the rotary element 12 by the angle θ relative to the rotary axis Ra.

The rotary laser beam emitter 104 according to the fourth embodiment can attain the same advantageous effects as those of the rotary laser beam emitter 10 according to the first embodiment. In addition, a reflective position of the reflective face 36 on the optical path from the LD 50 to the collimator lens 514 and the angular magnification of the beam expander 534 can be arbitrarily set to be adaptable for each other, which can improve the degree of freedom in which the beam emitting unit 414 is designed.

Fifth Embodiment

Next, a rotary laser beam emitter 105 will be described with reference to FIGS. 18, 19. The rotary laser beam emitter 105 is different from the rotary laser beam emitter 104 according to the fourth embodiment in the structure of a beam emitting unit 415. The basic structure thereof is the same as the rotary laser beam emitter 104, therefore, the same elements are given the same numeric codes and a detailed description thereof is omitted.

Figure 18:
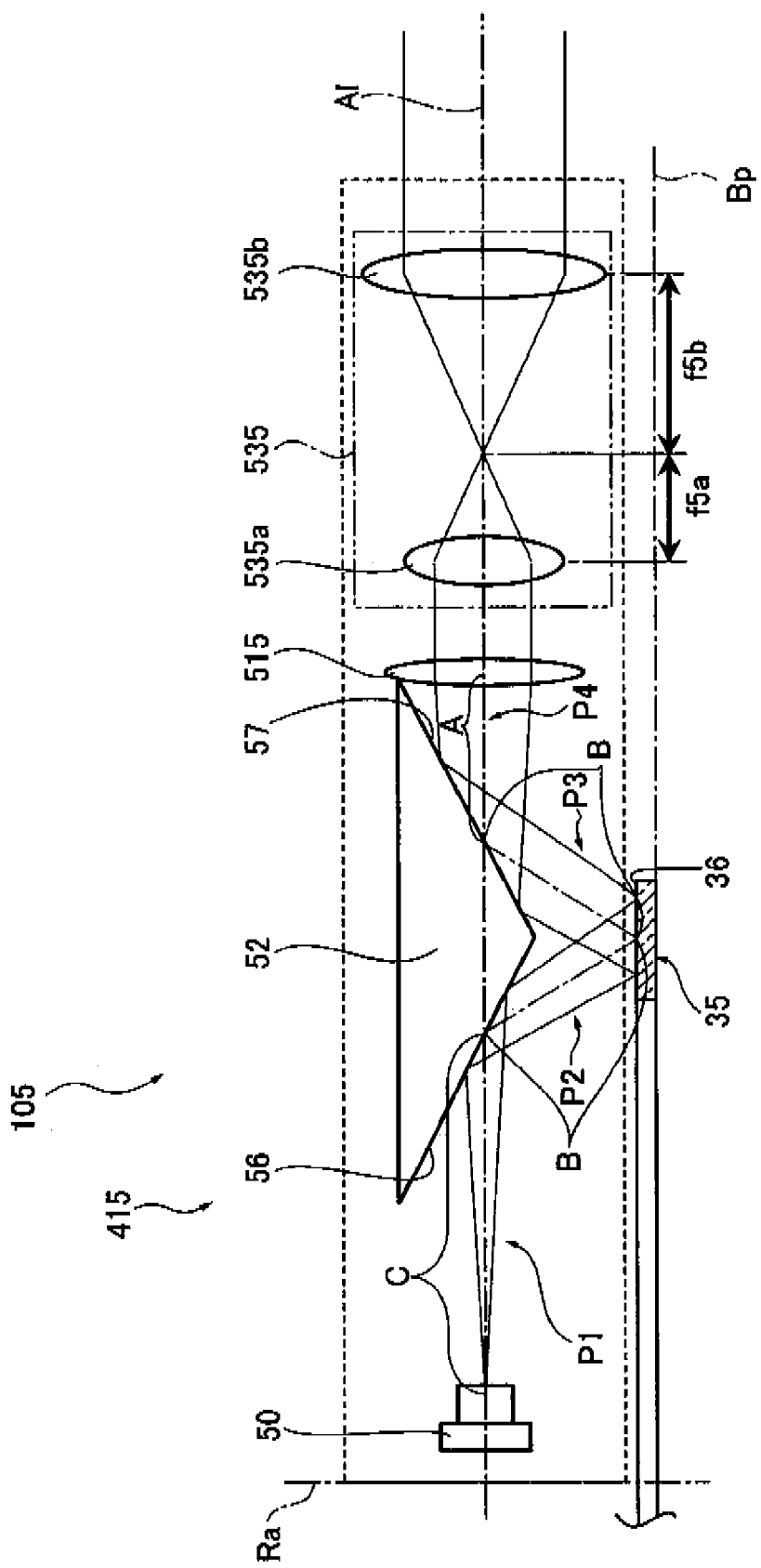
FIG. 18 schematically shows the structure of a beam emitting unit of a rotary laser beam emitter according to a fifth embodiment.
Figure 19:
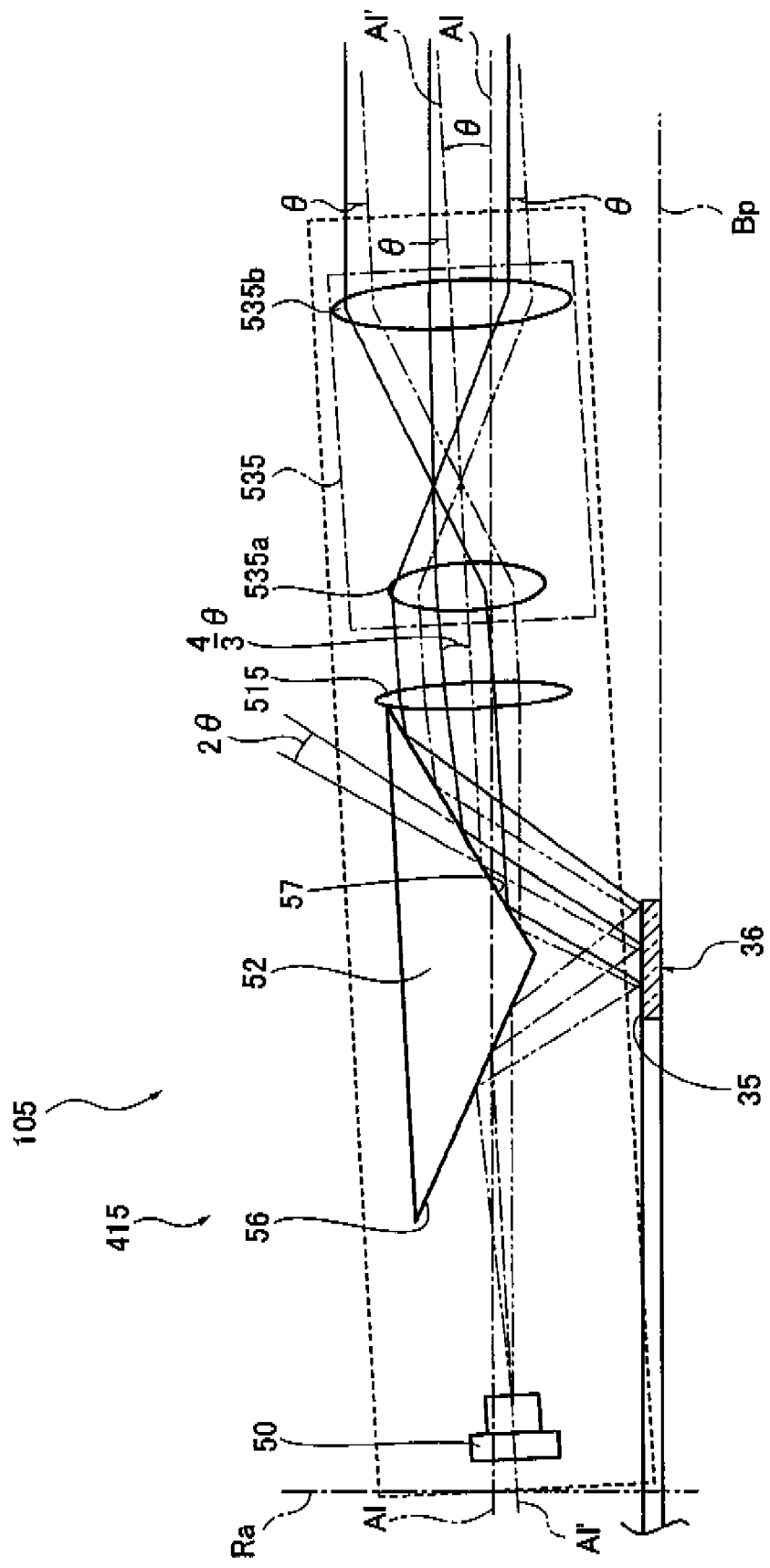
FIG. 19 shows the beam emitting unit according to the fifth embodiment when the optical axis Al is inclined by an angle θ.

FIG. 18 schematically shows the structure of the beam emitting unit 415 of the rotary laser beam emitter 105 according to the fifth embodiment and FIG. 19 schematically shows the beam emitting unit 415 whose optical axis Al is inclined by angle θ. In FIG. 19 the optical axis Al' is assumed to be inclined by angle θ when the intersection of the optical axis Al of the beam emitting unit 415 and the first reflective face 56 of the on-axis reflector 52 is the center of rotation for better understanding.

As shown in FIG. 18, a collimator lens 515 is placed at a different position and a beam expander 535 is differently configured, compared with those in the beam emitting unit 414 in the fourth embodiment.

In the beam emitting unit 415 the focal length of the collimator lens 515 is set to (A+2B+C) where length of an optical path P1 is C, lengths of optical paths P2, P3 are B, and that of an optical path P4 is A. The lengths A to C is set to satisfy 2(A+B)=B+C. The reflective face 36 is set to reflect at a position satisfying (length from LD 50 to reflective position):(length from reflective position to collimator lens 515)=1 to 2.

Therefore, in the beam emitting unit 415 the length M=2 and the length N=1 in FIG. 16 so that the angle x=(4/3)θ. With the rotary element 12 inclined by elevation angle θ relative to the rotary axis Ra, a laser beam from the LD 50 is incident on the beam expander 535 at elevation angle (4/3)θ relative to the optical axis Al' as shown in FIG. 19.

In order to negate the inclination, in the beam expander 535 the ratio of the focal lengths f5a and f5b of lenses 535a and 535b is set to 3 to 4 and the angular magnification is set to 3/4 as shown in FIG. 18. Therefore, a laser beam is incident on the lens 535a at angle α and emitted from the lens 535b at angle −(3/4)α relative to the optical axis.

Thus, with an inclination of the optical axis Al of the beam emitting unit 415 by elevation angle θ, a laser beam is incident on the beam expander 535 at elevation angle (4/3)θ and emitted therefrom at depression angle θ (−θ) relative to the optical axis Al'. Because the optical axis Al' is inclined to the reference plane Bp by elevation angle θ, the laser beam is emitted from the beam expander 535 in parallel to the reference plane Bp. This also holds true when the rotary posture of the rotary element 12 is inclined to cause the optical axis Al to be inclined by depression angle θ'(−θ'), as in the beam emitting unit 41 in the first embodiment.

Accordingly, the rotary laser beam emitter 105 according to the present embodiment can always emit the laser beam Lm in parallel to the reference plane Bp via the beam expander 535 for measuring a target position, even with the inclination of the rotary element 12 relative to the rotary axis Ra by angle θ.

The rotary laser beam emitter 105 according to the fifth embodiment can attain the same advantageous effects as those of the rotary laser beam emitter 10 in the first embodiment, In addition, a reflective position of the ring-like reflective face 36 on the optical path from the LD 50 to the collimator lens 515 and the angular magnification of the beam expander 535 can be arbitrarily set to be adaptable for each other, which can improve the degree of freedom in which the beam emitting unit 415 is designed.

Sixth Embodiment

Next, a rotary laser beam emitter 106 according to the sixth embodiment will be described with reference to FIG. 20. The rotary laser beam emitter 106 is different from the rotary laser beam emitter 10 according to the first embodiment in the structure of a beam emitting unit 416. The basic structure thereof is the same as the rotary laser beam emitter 10, therefore, the same elements are given the same numeric codes and a detailed description thereof is omitted.

Figure 20:
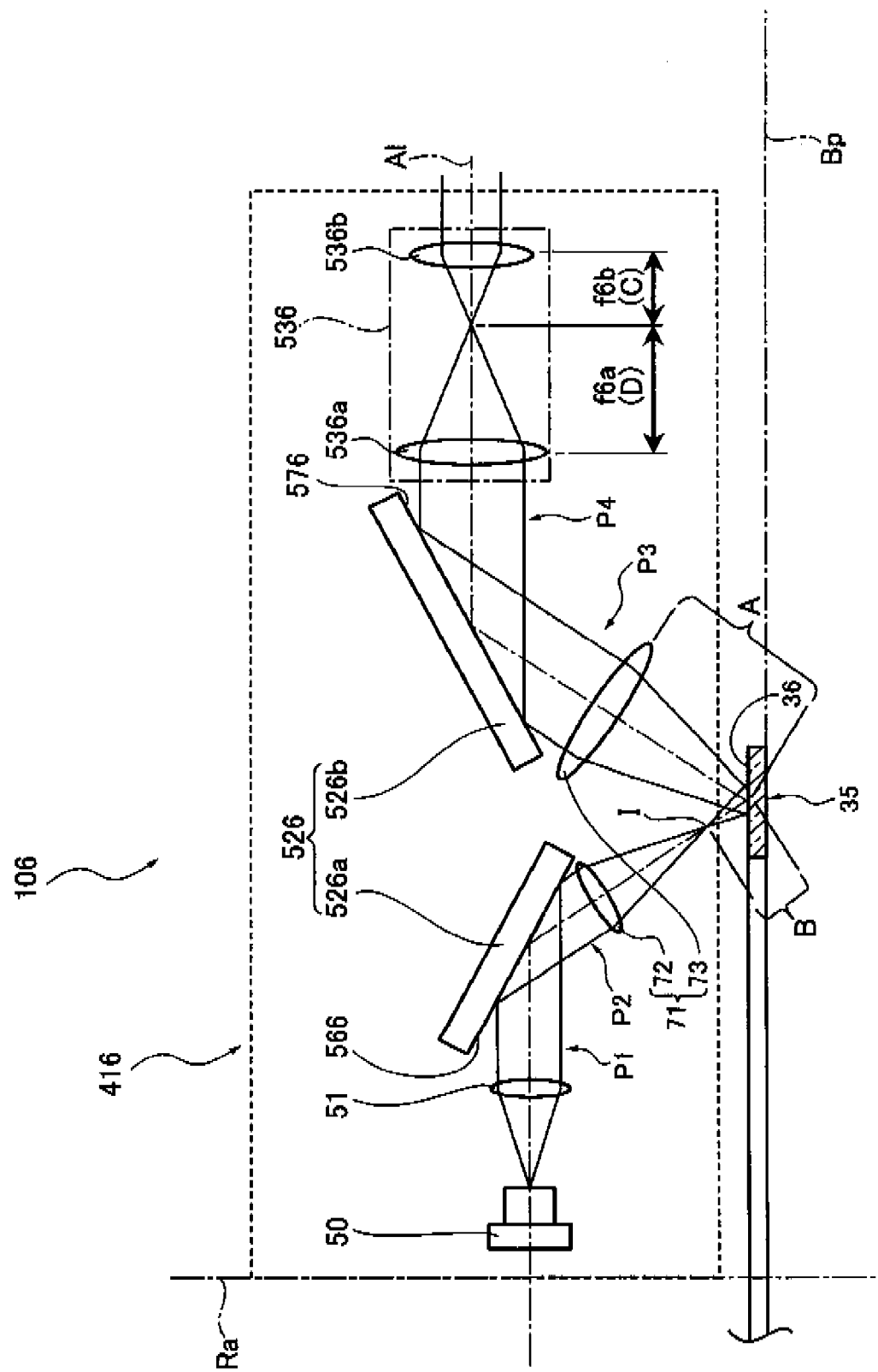
FIG. 20 schematically shows a beam emitting unit of a rotary laser beam emitter according to a sixth embodiment.

FIG. 20 schematically shows the structure of the beam emitting unit 416 of the rotary laser beam emitter 106 according to the sixth embodiment. As shown in the beam emitting unit 416 in FIG. 20, another beam expander 71 is placed between an on-axis reflector 526 and the reflective face 36 and a beam expander 536 and the on-axis reflector 526 are differently configured, compared with those in the beam emitting unit 41 in the first embodiment.

In the beam emitting unit 416 the on-axis reflector 526 is comprised of two optical elements, first and second reflective elements 526a, 526b. The first reflective element 526a comprises a first reflective face 566 while the second reflective element 526b comprises a second reflective face 576. A laser beam from the LD 50 passes through the collimator lens 51 (optical path P1) and is reflected by the first reflective face 566 of the first reflective element 526a to the reflective face 36 of the ring-like mirror 35 (optical path P2). The laser beam reflected by the reflective face 36 is reflected by the second reflective face 576 of the second reflective element 526b (optical path P3) to the beam expander 536 on the optical axis Al (optical path P4).

The beam expander 71 is comprised of a lens 72 on the optical path P2 and a lens 73 on the optical path P3 to expand a beam size of a parallel beam. The beam expander 71 is disposed so that the focal position of the lenses 72, 73 (code I in FIG. 20) is placed between the first reflective face 566 and the reflective face 36 (optical path P2). In the optical path of a laser beam from the LD 50, a distance from the focal position I to the reflective face 36 is set to be B and a distance from the reflective face 36 and the lens 73 is set to be A.

With an inclination of the rotary posture of the rotary element 12 by angle θ (inclined optical axis Al'), the optical paths from the LD 50 to the collimator lens 51 in the beam emitting unit 416 are the same as in the beam emitting unit 41 in the first embodiment. As in the first embodiment, actual optical paths P1' to P4' in the inclined state and virtual optical paths P1' to P4'' inclined by the angle θ to the reference paths are assumed (FIGS. 7, 8). There is no difference in amount of inclination between the actual optical paths P1', P2' and the virtual optical paths P1'', P2'', respectively, however, there is between the optical path P3' and the virtual optical path P3'' after reflected by the reflective face 36 by angle 2θ. Accordingly, with an inclination of the rotary element 12 by angle θ relative to the rotary axis Ra, a laser beam is inclined by the angle 2θ relative to the optical axis Al', reflected by the reflective face 36, and incident on the lens 73.

Thus, in the beam emitting unit 416 a diffusive laser beam from the focal position I is considered to be reflected by the ring-like reflective face 36 and converted into a parallel beam by the lens 73. Referring to FIG. 16, the length M=A and the length N=8, and with the inclination angle θ of the rotary element 12, a laser beam is incident on the lens 73 at an inclination angle $[2B/(A+B)]θ$ relative to the inclined optical axis Al' by angle θ, which is obtained from $x=2Nθ/(M+N)$ in the fourth embodiment.

In the beam expander 536 the ratio of the focal lengths f6a, f6b of the lenses 536a, 536b is set to D to C, and the angular magnification is set to D/C and $C/D=2B/(A+B)$. Accordingly, a laser beam is incident on the lens 536a at angle $[2B/(A+B)]α$ and emitted from the lens 536b at angle −α relative to the optical axis.

With an inclination of the optical axis Al by elevation angle θ, although not shown, a laser beam is incident on the beam expander 536 at elevation angle $[2B/(A+B)α]$ and emitted therefrom at depression angle θ (−θ) relative to the optical axis Al'. The optical axis Al' is inclined by elevation angle θ to the reference plane Bp so that the laser beam is emitted from the beam expander 536 in parallel to the reference plane Bp. This holds true when the rotary posture of the rotary element 12 is inclined relative to the rotary axis Ra to cause the optical axis Al to be inclined by depression angle θ' (−θ'), as in the beam emitting unit 41 in the first embodiment.

Accordingly, the rotary laser beam emitter 106 according to the present embodiment can always emit the laser beam Lm in parallel to the reference plane Bp via the beam expander 536 for measuring a target position, even with the inclination of the rotary element 12 relative to the rotary axis Ra by angle θ.

The rotary laser beam emitter 106 according to the sixth embodiment can attain the same advantageous effects as those of the rotary laser beam emitter 10 in the first embodiment.

In addition, the rotary laser beam emitter 106 comprises the on-axis reflector 526 having the first and second reflective elements 526a, 526b so that the first reflective face 566 and the second reflective face 576 can be designed to have sizes adaptable to the beam sizes of the parallel laser beams from the collimator lens 51 and the lens 73, respectively. Accordingly, it is possible to improve the degree of freedom in which the position, size and the like of the on-axis reflector 526 are set.

Moreover, according to the rotary laser beam emitter 106, it is possible to arbitrarily set the positional relation and focal position of the lenses 72, 73 of the beam expander 71 and the angular magnification of the beam expander 536 to be adaptable to each other, which can improve the degree of freedom in which the beam emitting unit is designed.

Seventh Embodiment

Next, a rotary laser beam emitter 107 according to a seventh embodiment will be described with reference to FIGS. 21, 22. The rotary laser beam emitter 107 is different from the rotary laser beam emitter 106 according to the sixth embodiment in the structure of a beam emitting unit 417. The basic structure thereof is the same as the rotary laser beam emitter 106, therefore, the same elements are given the same numeric codes and a detailed description thereof is omitted.

Figure 21:
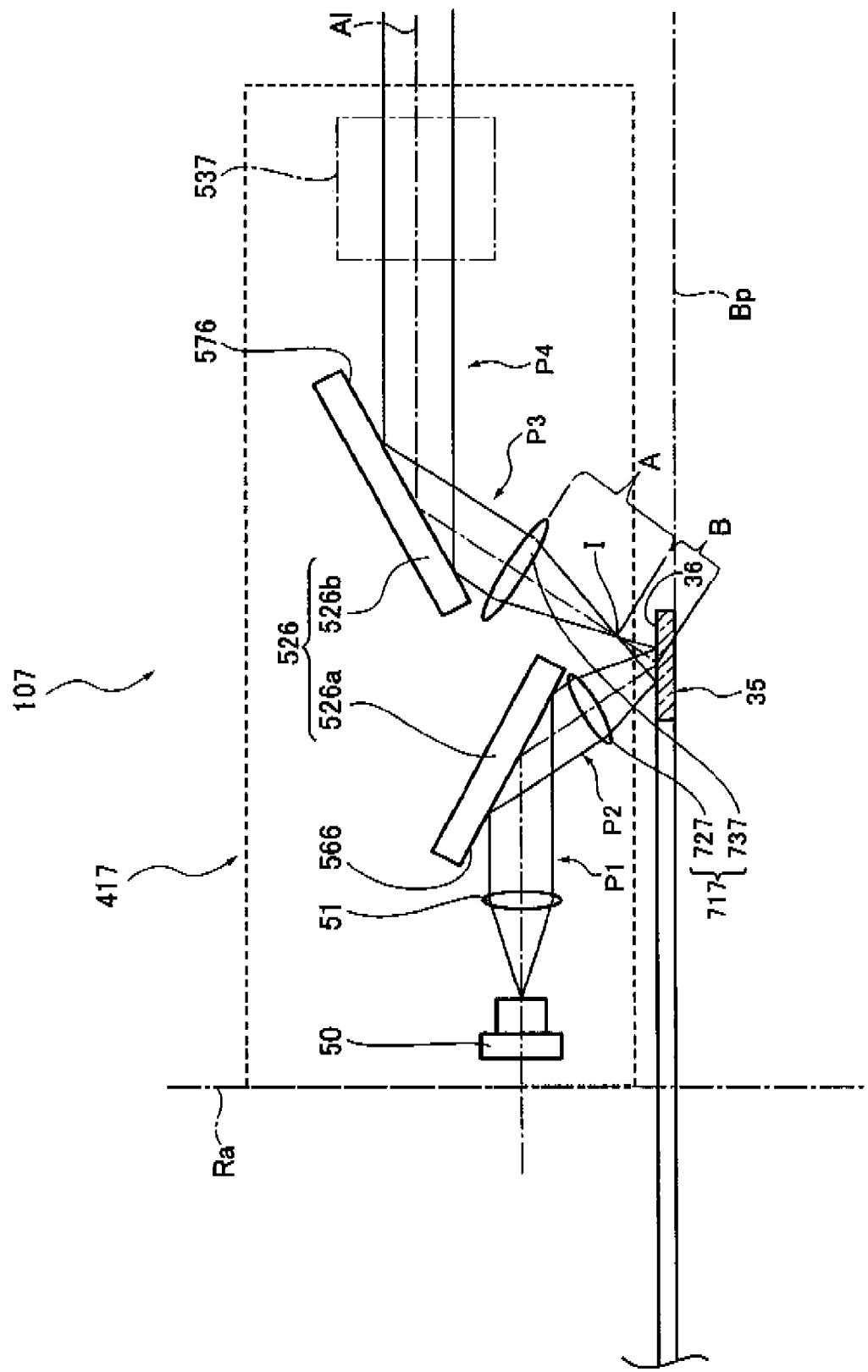
FIG. 21 schematically shows a beam emitting unit of a rotary laser beam emitter according to a seventh embodiment.

FIG. 21 schematically shows the structure of the beam emitting unit 417 of the rotary laser beam emitter 107 according to the seventh embodiment. FIG. 22 shows an optical path from a virtual light source 74 to a lens 737 in the beam emitting unit 417 in a simplified manner to describe the lens action of the beam emitting unit 417.

As shown in the beam emitting unit 417 in FIG. 21, a beam expander 717 provided between the on-axis reflector 526 and the reflective face 36 and a beam expander 537 are differently configured from those in the beam emitting unit 416 in the sixth embodiment.

In the beam emitting unit 417 same as that 416, the on-axis reflector 526 is comprised of the first and second reflective elements 526a, 526b. A laser beam from the LD 50 (optical path P1) is reflected by the first reflective face 566 of the first reflective element 526a to the reflective face 36 of the ring-like mirror 35 (optical path P2). The laser beam reflected by the reflective face 36 is reflected by the second reflective face 576 of the second reflective element 526b (optical path P3) to the beam expander 537 on the optical axis Al (optical path P4).

The beam expander 717 is comprised of a lens 727 on the optical path P2 and a lens 737 on the optical path P3 to expand a beam size of a parallel beam. The beam expander 71 is disposed so that the focal position of the lenses 727, 737 (code I in FIG. 21) is set between the second reflective face 576 and the ring-like reflective face 36 (optical path P3). In the optical path of a laser beam from the LD 50, a distance from the reflective face 36 to the focal position I is set to be B and a distance from the focal position I to the lens 737 is set to be A. In the seventh embodiment A to B=2 to 1.

With an inclination of the rotary posture of the rotary element 12 by angle θ' (inclined optical axis Al'), the optical paths from the LD 50 to the lens 737 in the beam emitting unit 417 are the same as in the beam emitting unit 41 in the first embodiment. As in the first embodiment, actual optical paths P1' to P4' in the inclined state and virtual optical paths P1" to P4" inclined by the angle θ' to the reference path are assumed (FIGS. 7, 8). There is no difference in amount of inclination between the actual optical paths P1', P2' and the virtual optical paths P1", P2", respectively, however, there is between the optical path P3' and the virtual optical path P3" after reflected by the reflective face 36 by angle 2θ'. Accordingly, with an inclination of the rotary element 12 by angle θ relative to the rotary axis Ra, a laser beam is inclined by the angle 2θ' relative to the optical axis Al', reflected by the reflective face 36, and incident on the lens 737.

Figure 22:
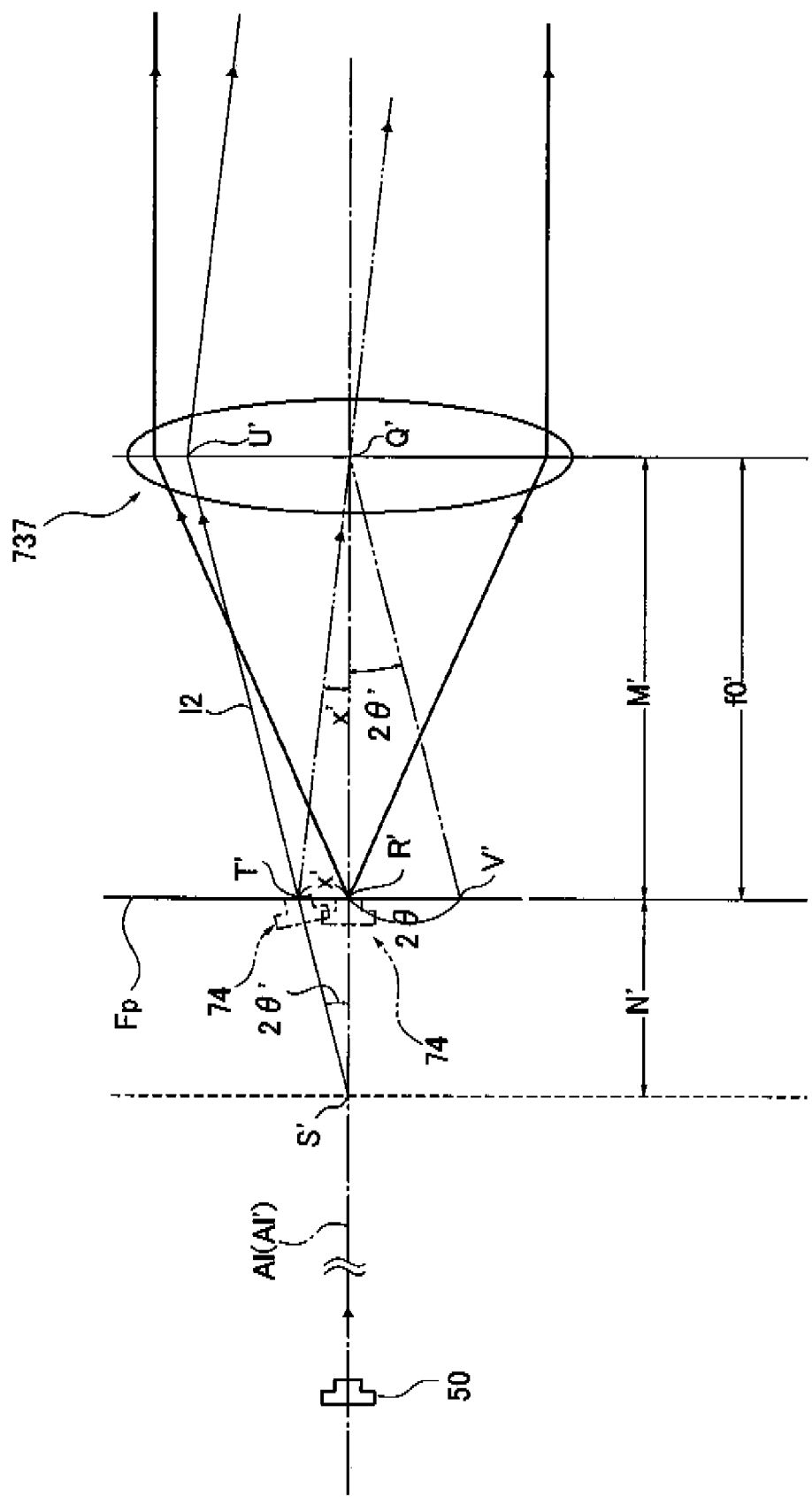
FIG. 22 shows an optical path from a virtual light source to a lens in the beam emitting unit in a simplified manner.

Thus, in the beam emitting unit 417 a diffusive laser beam from the focal position I is considered to be converted into a parallel beam by the lens 737, as shown in FIG. 22 in a simplified manner. FIG. 22 is almost the same as FIG. 16 except the lens 737 provided instead of the collimator lens 514 and the virtual light source 74 provided at the focal position I. A positional relation between the virtual light source 74 and a point S' (reflective position on the reflective face 36) in FIG. 22 and that between the LD 50 and the point S in FIG. 16 are reverse to each other.

That is, in FIG. 22 the virtual light source 74 and the lens 737 are distanced away from each other with an interval of f0' as the focal length of the lens 737 on the optical axis Al. The exit position of the virtual light source 74 is on the focal plane Fp of the lens 737. The positional relation of the LD 50 and the lens 737 to the optical axis Al (Al') is constant. With the inclination of the rotary element 12 relative to the rotary axis Ra by an angle θ', the optical axis Al is assumed to be not inclined (Al and Al' are indicated by the same line), and the laser beam is assumed to start inclining at the point S' relative to the optical axis Al' (Al). In FIG. 22 with an inclination of a laser beam relative to the optical axis Al' (Al), the virtual light source 74 is moved to an intersection T' of the laser beam from the point S' and the focal plane Fp.

The diffusive laser beam from the virtual light source 74 is converted into a parallel beam by the lens 737. FIG. 22 shows the center, Q' of the lens 737, an exit position R' of the virtual light source 74, and a reflective position S' of the reflective face 36 on the optical path. A line S' to U' is a laser beam 12 from the point 5' inclined at an angle 2θ' relative the optical axis Al' (line Q' to R') and incident on the lens 737. In the drawing a length of the line Q' to S' from the lens 737 to the exit position of the virtual light source 74 is defined to be M' and that of the line S' to R' from the exit position to the reflective face 36 is defined to be N'.

Having passed through the lens 737, the parallel beam 12 travels from the intersection T' of the line S' to U' and the focal plane Fp to the center Q' of the lens 737 (in parallel to a line T' to Q'). The parallel beam 12 with angle x' relative to the optical axis Al' (line Q to R) travels to the beam expander 537 (FIG. 21).

Now, when an intersection of a line parallel to the laser beam 12 and on the center Q' of the lens 737 and the focal plane Fp is assumed to be a point V', the line Q' to V' is inclined to the optical axis Al' (line Q' to R') by angle 2θ'. In the present embodiment the inclination angle θ' to the optical axis Al is an extremely small value so that an equation tanθ'=θ' (2θ) holds. Because of this, when comparing two triangles Q'R'V' and Q'R'T' with the same base, the ratio of angle 2θ' of apex Q' of the triangle Q'R'V' and angle x' of that of the triangle Q'R'T' is equal to that of lengths of the lines R' to V' and R' to T'. Thus, in a triangle Q'R'V' including a side R' to V' and a triangle S'R'T' including a side R' to T', (line Q' to R'):(line R' to V')=(line S' to R'):(line R' to T') and (M'):(2θ')= (N'):(x') so that x'=(2N'/M')θ' is established.

Therefore, in the beam emitting unit 417 configured above, a traveling direction of a parallel beam from the lens 737 at angle x' is determined by a distance between the lens 737 and the virtual light source 74 (focal length f0') and a distance between the virtual light source 74 and the point S' or a reflective position on the reflective face 36 on the optical axis Al'. However, this holds true on the premise that the ratio of the length M' (line Q' to R') and that N' (line S' to R') does not change before (optical paths P1 to P4) and after (actual optical paths P1' to P4' in FIGS. 7, 8) the inclination of the rotary element. In the present embodiment this premise can hold true since a variation in the incidence angle of the laser beam is extremely small and so is a change in the ratio of the optical path lengths before and after the reflection.

In the beam emitting unit 414 the ratio of the lengths M', N' between the virtual light source 74 and the lens 737 and between the virtual light source 74 and the point S' on the optical axis Al' is set to 2 to 1. From x'=(2N'/M')θ', x'=θ' is established. As described above, a laser beam is emitted from the lens 737 at angle x' reverse to that before incident on the lens 737 so that x'=−θ'. With the rotary element 12 inclined by angle θ' to the rotary axis Ra, a laser beam from the LD 50 is emitted at an inclination angle −θ relative to the optical axis Al'. This eliminates the necessity of the beam expander 537 to change a traveling direction of the laser beam from the lens 737 and the beam emitting unit 417 does not include the beam expander 537 as shown in FIG. 21.

Thus, with the inclination of the optical axis Al by elevation angle θ', a laser beam is emitted from the lens 737 at depression angle θ' (−θ') relative to the optical axis Al' in the beam emitting unit 417. Since the optical axis Al' is inclined by elevation angle θ' relative to the reference plane Bp, the laser beam from the lens 737 is parallel to the reference plane Bp. This also holds true when the rotary posture of the rotary element 12 is inclined to cause the optical axis Al to be inclined by depression angle θ' (−θ'), as in the beam emitting unit 41 in the first embodiment.

Accordingly, the rotary laser beam emitter 107 according to the present embodiment can always emit the laser beam Lm in parallel to the reference plane Bp via the lens 737 for measuring a target position, even with the inclination of the rotary element 12 relative to the rotary axis Ra by angle θ'.

The rotary laser beam emitter 107 according to the seventh embodiment can attain the same advantageous effects as those of the rotary laser beam emitter 106 in the sixth embodiment. In addition, the rotary laser beam emitter 107 does not need the beam expander 537 so that it can be easily reduced in size and weight and simply structured.

Moreover, the rotary laser beam emitter 107 according to the seventh embodiment is configured not to include the beam expander 537 by setting the ratio of the lengths M', N' between the virtual light source 74 and the lens 737 and between the virtual, light source 74 and the point S' on the optical axis Al' to 2 to 1. However, the present invention is not limited to such a configuration. For example, with an inclination of the optical axis Al by angle θ', a laser beam is emitted from the lens 737 at angle x'=(2N'/M')θ' so that with use of a beam expander 537 whose angular magnification is (M'/2N'), the values of M' to N' can be arbitrary.

The above embodiments have described an example where the support shaft 34 is inserted into the rotary element 12 containing the beam emitting unit and the communication unit is disposed on the mount 37 on the top of the rotary element. However, the present invention is not limited to such an example. The present invention is applicable to the other types of rotary laser beam emitters as long as the beam emitting unit is contained in the rotary element rotating around the rotary axis Ra and the optical axis of the beam emitting unit may incline due to an inclination of the rotary element 12 to the rotary axis Ra.

The above embodiments have described an example of using the reflective face 36 of the ring-like mirror 35 as a reference reflector. However, the present invention is not limited to such an example. The reference reflector can be arbitrarily structured as long as it can form the optical paths P2, P3 in cooperation with the on-axis reflector 52 irrespective of the rotary position of the rotary element 12.

The first and third to fifth embodiments have described an example where the on-axis reflector 52 is made of a columnar element whose cross section is an isosceles triangle. However, the present invention is not limited to such an example. The on-axis reflector 52 can be a prismatic element or made of two plate-like elements, for example (sixth and seventh embodiments) as long as it includes the first and second reflective faces 56, 57 and forms the optical paths P2, P3 in cooperation with the reference reflector (ring-like reflective face 36).

The above embodiments have described an example where the beam shaping system 54 of the beam emitting unit is configured to split a laser beam having passed through the beam expander into three. However, the present invention is not limited to such an example. It can be arbitrarily configured as long as it can emit a laser beam suitable for measuring the inclination angle and height of a target position.

Figure 23:
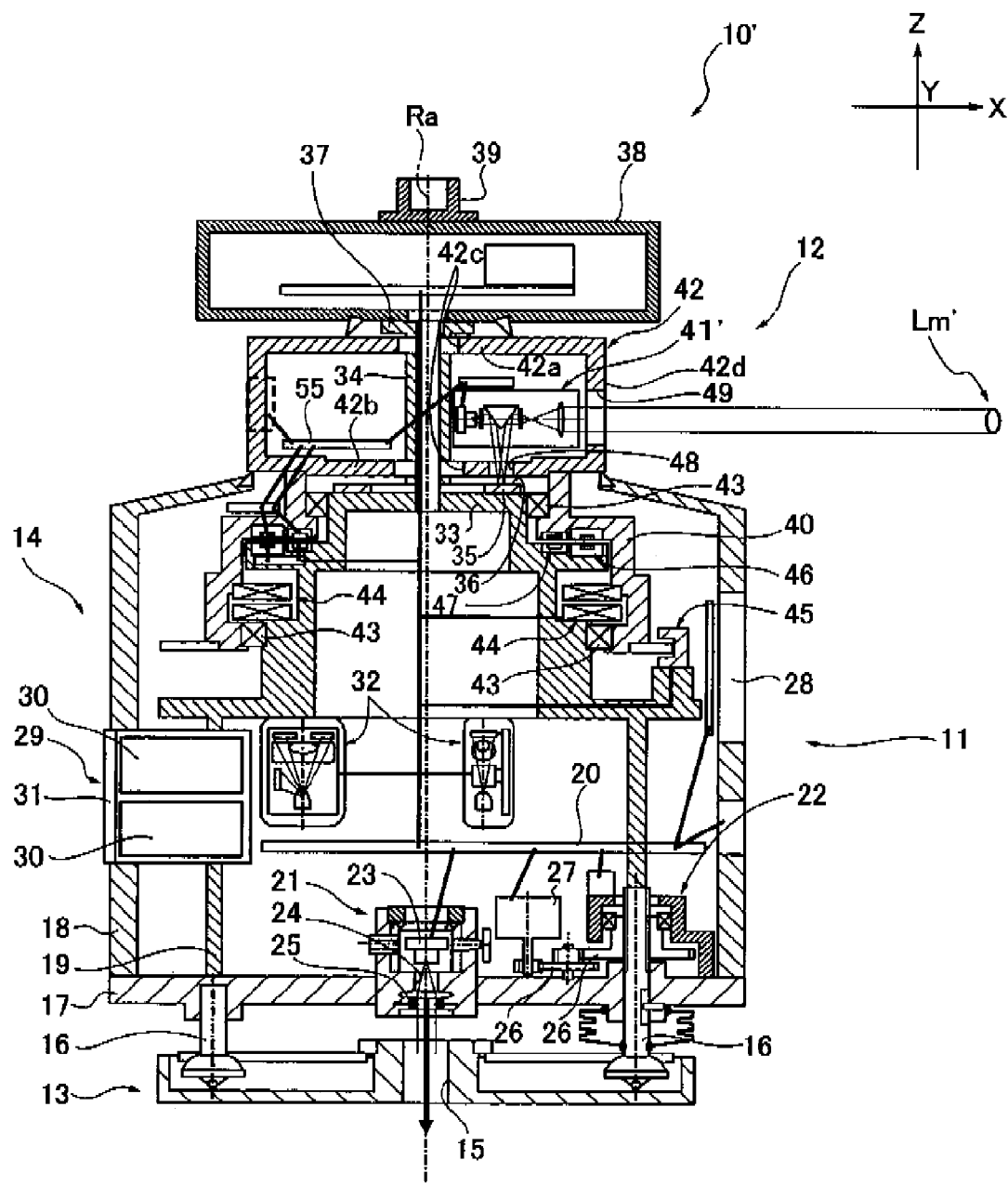
FIG. 23 shows another example of a rotary laser beam emitter according to the present invention.

The above embodiments have described an example where the beam shaping system 54 is configured to shape a laser beam having passed through the beam expander in a fan-like form spreading toward a traveling direction. However, the form of the laser beam can be arbitrary as long as it is emitted in rotation around the rotary axis Ra. By way of example, FIG. 23 shows another rotary laser beam emitter 10' which is configured to emit a rod-like laser beam Lm' and does not include the beam shaping system 54 in a beam emitting unit 41'.

The fourth to seventh embodiment have described an example where a laser beam is reflected once by the reference reflective face. However, the number of reflections by the reference reflective face can be arbitrarily set as in the third embodiment. When the number of reflection is set to k, for example, an inclination angle of the laser beam due to the reflections is 2kθ if the rotary element 12 is inclined by angle θ relative to the rotary axis Ra. In this case, the focal position on the optical path and the angular magnification of the beam expander can be set to negate the inclination angle 2kθ (fourth to seventh embodiments).

According to the embodiments of the present invention, the beam expander is provided on the optical path of a laser beam reflected by the optical reflector on the optical axis. The optical reflector and the optical neutralizer including the beam expander and the optical parallel element can be properly set to be adaptable to each other by setting the angular magnification of the beam expander based on the number of reflections by the reference reflective face of the optical reflector and on the position of the optical parallel element on the optical path of a laser beam from the light source. This can increase the degree of freedom in which the optical emission system is designed. Further, the beam emitting unit can always emit a laser beam in parallel to the reference plane.

Furthermore, according to the embodiments of the present invention, the optical parallel element is provided on the optical path of the laser beam before reflected by the reference reflective face. When the angular magnification of the beam expander is set to 1/2 k where k is a number of times the laser beam is reflected by the reference reflective face, the beam emitting unit can emit the laser beam in parallel to the reference plane without fail even with an inclination of the rotary element relative to the rotary axis. For example, at the number of times of laser beam reflections being 1 (k=1) and the inclination angle θ of the rotary element, the optical axis of the beam emitting unit is inclined by angle θ relative to the reference plane so that the laser beam reflected by the optical reflector and the reference reflective face is inclined by the angle θ relative to the laser beam in the reference state. Further, since the optical axis of the beam emitting unit is inclined by the angle θ, the laser beam reflected by the reference reflective face and the optical reflector to the beam expander is inclined by angle 2θ relative to the inclined optical axis. The beam expander whose angular magnification is 1/2 receives the laser beam inclined by the angle 2θ and emits the laser beam at angle −θ relative to the optical axis inclined by angle θ, that is, in parallel to the reference plane. Because of this, the rotary laser beam emitter according to the present invention can emit the laser beam in parallel to the reference plane without fail even with the inclination of the rotary element relative to the rotary axis.

Furthermore, according to the embodiments of the present invention, the optical reflector is an element long in a direction parallel to the reference plane on the optical axis and has a simple structure of the first and second reflective faces whose inclination angles relative to the optical axis are set to be the same absolute value and the first reflective face reflecting a laser beam from the light source parallel to the reference plane to the reference reflective face and the second reflective face reflecting the laser beam reflected by the first reflective face to the optical axis.

Furthermore, according to the embodiments of the present invention, the optical parallel element is disposed on the optical path of the laser beam reflected by the reference reflective face and closer to the reference reflective face than the beam expander so that the focal position thereof on the light source side is to be on the optical path of the laser beam before reflected by the reference reflective face. By setting the angular magnification of the beam expander to (M+N)/2N where the number of reflections of the reference reflective face is 1, M is a distance from the center of the optical parallel element and the reference reflective face, and N is a distance from the reference reflective face to the focal position of the optical parallel element, the rotary laser beam emitter can always emit a laser beam from the beam emitting unit in parallel to the reference plane even with an inclination of the rotary element relative to the rotary axis.

Furthermore, according to the embodiments of the present invention, the optical parallel element is disposed on the optical path of the laser beam reflected by the reference reflective face and closer to the reference reflective face than the beam expander so that the focal position thereof on the light source side is to be on the optical path of the laser beam before reflected by the reference reflective face. By setting the angular magnification of the beam expander to (M+N)/4 kN where the number of reflections of the reference reflective face is k, M is a distance from the center of the optical parallel element and the reference reflective face, and N is a distance from the reference reflective face to the focal position of the optical parallel element, the rotary laser beam emitter can always emit a laser beam from the beam emitting unit in parallel to the reference plane even with an inclination of the rotary element relative to the rotary axis.

Furthermore, according to the embodiments of the present invention, the beam expander is simply configured of a pair of lenses facing each other so that their focal positions coincide with each other on the optical path of the laser beam reflected by the reference reflective face. By setting the number of reflections of the reference reflective face to 1 and the ratio of the distances from the center of the optical parallel element to the focal position and from the focal position to the reference reflective face to 2 to 1, the rotary laser beam emitter with a very simple structure can always emit a laser beam from the beam emitting unit in parallel to the reference plane even with an inclination of the rotary element relative to the rotary axis.

Furthermore, according to the embodiments of the present invention, the beam expander is disposed on the optical axis of the beam emitting unit and on the optical path of a laser beam reflected by the reference reflective face and the optical reflector. The optical parallel element is disposed on the optical path of the laser beam reflected by the reference reflective face closer to the reference reflective face than the beam expander so that the focal position on the light source side is to be on the optical path of the laser beam reflected by the reference reflective face. By setting the angular magnification of the beam expander to M'/2N' where the number of reflections of the reference reflective face is 1, M' is a distance from the center of the optical parallel element to the focal position, and N' is a distance from the focal position to the reference reflective face, the rotary laser beam emitter can always emit a laser beam from the beam emitting unit in parallel to the reference plane even with an inclination of the rotary element relative to the rotary axis.

Furthermore, according to the embodiments of the present invention, the beam emitting unit includes cylindrical lenses which shape laser beams into fan-like laser beams spreading towards the traveling direction, to emit three (at least two) fan-like laser beams via the cylindrical lenses. In their cross section two of the laser beams are in parallel with an interval and one of them extends between the top end of one laser beam and the bottom end of the other laser beam. With such a configuration, the rotary laser beam emitter can emit a so-called N-form fan beam in parallel to the reference plane which is suitable for measuring inclination angles and heights.

Furthermore, according to the embodiments of the present invention, the beam emitting unit is configured to include three prism blocks which split a laser beam from the beam expander into three and to emit two laser beams with an interval via the cylindrical lenses in parallel to the rotary axis and a diagonal laser beam between the two laser beams. Accordingly, even with an inclination of the rotary element relative to the rotary axis, the rotary laser beam emitter according to the present invention can always emit three laser beams with a predetermined positional relation in parallel to the reference plane to accurately calculate vertical angles with ease and measure the inclination angles and heights with precision.

Although the present invention has been described in terms of exemplary embodiments, it is not limited thereto. It should be appreciated that variations may be made in the embodiments described by persons skilled in the art without departing from the scope of the present invention as defined by the following claims.

What is claimed is:

1. A rotary laser beam emitter comprising:
a base unit including a reference reflector having a reference reflective face parallel to a reference plane;
a rotary element supported on the base unit and rotatable around a rotary axis; and
a beam emitting unit contained in the rotary element and comprising a light source for emitting a laser beam along an optical axis orthogonal to the rotary axis and an optical emission system for receiving the laser beam from the light source and emitting the laser beam in a direction parallel to the reference plane,
wherein, when the rotary element is inclined relative to the rotary axis, causing the laser beam emitted from the light source to be inclined relative to the reference plane, the optical emission system is configured to have the inclined laser beam reflected by the reference reflective face in a direction inclined to an optical axis of the inclined laser beam so as to neutralize the inclination of the laser beam.

2. A rotary laser beam emitter according to claim 1, wherein
the optical emission system comprises an optical reflector configured to reflect the laser beam emitted from the light source to the reference reflective face and to reflect the laser beam reflected by the reference reflective face in a direction of the optical axis, and an optical neutralizer configured to emit the laser beam reflected by the reference reflective face in the direction inclined to the optical axis of the inclined laser beam as to neutralize the inclination of the laser beam.

3. A rotary laser beam emitter according to claim 2, wherein
the optical neutralizer comprises a beam expander which converts an incident laser beam into a parallel laser beam for emission and an optical parallel element which collimates the laser beam to be incident on the beam expander.

4. A rotary laser beam emitter according to claim 3, wherein
the beam expander is disposed on an optical path of the laser beam reflected by the reference reflective face and an angular magnification of the beam expander is set in accordance with a position of the optical parallel element on an optical path of the laser beam emitted from the light source and a number of times the laser beam is reflected by the reference reflective face.

5. A rotary laser beam emitter according to claim 1, wherein
the reference reflector is formed in a ring-like shape around the rotary axis.

6. A rotary laser beam emitter according to claim 1, wherein:

the beam emitting unit comprises a cylindrical lens which shapes the laser beam emitted from the optical emission system in such a fan-like shape that spreads out towards a traveling direction; and the beam emitting unit is configured to emit at least two fan-like laser beams via the cylindrical lens so that longitudinal directions of a cross section of the fan-like laser beams are different from each other.

7. A rotary laser beam emitter according to claim 6, wherein the beam emitting unit comprises an optical splitter which splits the laser beam emitted from the optical emission system into a plurality of laser beams.

8. A rotary laser beam emitter according to claim 7, wherein the optical splitter is a plurality of prism blocks arranged along a plane orthogonal to the rotary axis and joined with each other.

9. A rotary laser beam emitter according to claim 6, wherein optical axes of the fan-like laser beams are set to intersect at a same position on the rotary axis.

10. A rotary laser beam emitter comprising:

a base unit comprising a rotary axis, a support shaft coaxially extending along the rotary axis, and a reference reflector having a reference reflective face parallel to a reference plane;

a rotary element supported on the base unit and rotatable around the rotary axis; and a beam emitting unit contained in the rotary element and comprising a light source for emitting a laser beam along an optical axis orthogonal to the rotary axis and an optical emission system for receiving the laser beam from the light source and emitting the laser beam in a direction parallel to the reference plane, wherein, when the rotary element is inclined relative to the rotary axis, causing the laser beam emitted from the light source to be inclined relative to the reference plane, the optical emission system is configured to have the inclined laser beam reflected by the reference reflective face in a direction inclined to an optical axis of the inclined laser beam so as to neutralize the inclination of the laser beam.

* * * * *